United States Patent
Yaguchi

(10) Patent No.: US 7,598,689 B2
(45) Date of Patent: Oct. 6, 2009

(54) MOTOR DRIVE APPARATUS

(75) Inventor: Hideaki Yaguchi, Toyota (JP)

(73) Assignee: Toyota Jidosha Kabuhsiki Kaisha, Toyota (JP)

( * ) Notice: Subject to any disclaimer, the term of this patent is extended or adjusted under 35 U.S.C. 154(b) by 256 days.

(21) Appl. No.: 10/586,332

(22) PCT Filed: Oct. 28, 2004

(86) PCT No.: PCT/JP2004/016450

§ 371 (c)(1),
(2), (4) Date: Jul. 14, 2006

(87) PCT Pub. No.: WO2005/081395

PCT Pub. Date: Sep. 1, 2005

(65) Prior Publication Data

US 2007/0108936 A1 May 17, 2007

(30) Foreign Application Priority Data

Feb. 19, 2004 (JP) ............................. 2004-043295

(51) Int. Cl.
*H02M 3/155* (2006.01)
(52) U.S. Cl. ......................... 318/139; 363/60; 363/71; 363/123
(58) Field of Classification Search ................. 318/139; 363/44–49, 59–61, 71, 123, 124; 180/65.1, 180/65.2, 65.3
See application file for complete search history.

(56) References Cited

U.S. PATENT DOCUMENTS

| 5,710,699 | A | | 1/1998 | King et al. |
| 5,994,789 | A | * | 11/1999 | Ochiai ........................ 307/10.1 |
| 6,133,651 | A | * | 10/2000 | Kono et al. .................... 307/64 |
| 6,275,392 | B1 | * | 8/2001 | Streicher et al. .............. 363/35 |
| 6,804,127 | B2 | * | 10/2004 | Zhou ............................ 363/37 |
| 2002/0027425 | A1 | | 3/2002 | Asao et al. |
| 2004/0145338 | A1 | * | 7/2004 | Nakamura et al. ........... 318/801 |
| 2007/0296357 | A1 | * | 12/2007 | Song et al. ................... 318/139 |

FOREIGN PATENT DOCUMENTS

| JP | B 2834465 | 10/1998 |
| JP | A 2001-275367 | 10/2001 |
| JP | A 2003-199391 | 7/2003 |
| JP | A 2003-309997 | 10/2003 |
| JP | A 2004-048983 | 2/2004 |

(Continued)

OTHER PUBLICATIONS

U.S. Appl. No. 10/484,385, filed Jan. 1, 2004 in the name of Sato et al.

*Primary Examiner*—Bentsu Ro
(74) *Attorney, Agent, or Firm*—Oliff & Berridge, PLC

(57) ABSTRACT

A control device generates, upon receiving an instruction to start engine while drive wheels of a hybrid vehicle are driven by a motor generator, a signal to output the signal to a voltage step-up converter, and thereby drives and controls the voltage step-up converter to step up a DC voltage that is output from a battery to a maximum voltage of a motor drive apparatus. Then, the control device generates, when an output voltage of the voltage step-up converter reaches the maximum voltage, a signal to output the generated signal to an inverter. Accordingly, the inverter is driven and controlled to drive motor generator in powering mode.

22 Claims, 15 Drawing Sheets

FOREIGN PATENT DOCUMENTS

| | | |
|---|---|---|
| JP | A 2005-210779 | 8/2005 |
| KR | 2000-0009447 | 2/2000 |
| KR | 2002-0020174 | 3/2002 |
| WO | WO 89/06062 | 6/1989 |

* cited by examiner

F I G. 1 7
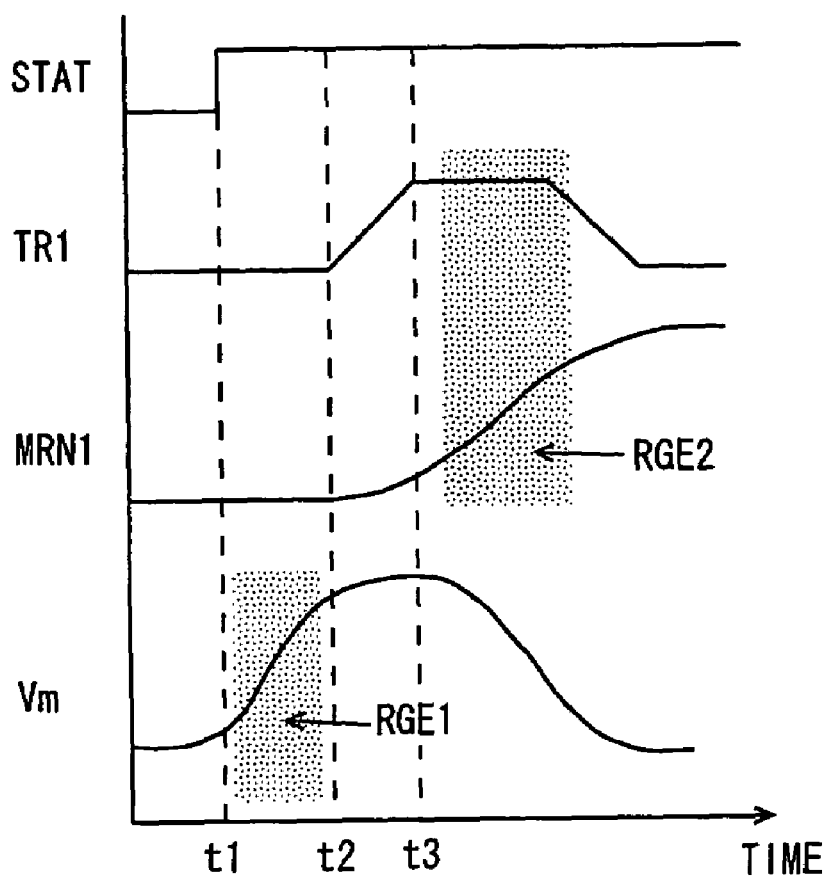

MOTOR DRIVE APPARATUS

TECHNICAL FIELD

The present invention relates to a motor drive apparatus, and particularly to a motor drive apparatus capable of preventing input/output of excessive electric power to/from a power supply that outputs a power supply voltage.

BACKGROUND ART

Japanese Patent No. 2834465 discloses a power-supply system apparatus for vehicles. This power-supply system apparatus includes a pulse inverter, a bidirectional converter and a battery. The bidirectional converter is connected between the battery and the pulse inverter, steps up a voltage from the battery to supply the resultant voltage to the pulse inverter, and steps down a voltage from the pulse inverter to supply the resultant voltage to the battery.

The pulse inverter uses the voltage supplied from the bidirectional converter to drive an asynchronous machine. The asynchronous machine is used as an electric generator or starter.

Thus, when the asynchronous machine is used as an electric generator, the power-supply system apparatus converts an alternating-current (AC) voltage generated by the asynchronous machine into a direct-current (DC) voltage by means of the pulse inverter, and uses the bidirectional converter to step down the DC voltage as converted to supply the resultant voltage to the battery.

Further, when the asynchronous machine is used as a starter, the bidirectional converter steps up a DC voltage from the battery to supply the resultant voltage to the pulse inverter, and the pulse inverter converts the DC voltage from the bidirectional converter into an AC voltage to drive the asynchronous machine.

The conventional power-supply system apparatus, however, has a problem that, in the case where a voltage step-up operation for stepping up a DC voltage from the battery and a drive operation for driving the asynchronous machine as a starter are carried out at the same timing, excessive electric power is taken from the battery to the asynchronous machine.

There is also a problem that, in the case where a voltage step-down operation for stepping down a DC voltage from the pulse inverter and a drive operation for driving the asynchronous machine as an electric generator are carried out at the same timing, excessive electric power is brought from the asynchronous machine into the battery.

Accordingly, an object of the present invention is to provide a motor drive apparatus that can prevent input/output of excessive electric power to/from a power supply.

DISCLOSURE OF THE INVENTION

According to the present invention, a motor drive apparatus includes a first drive circuit driving a first motor and a voltage converter performing a voltage conversion between a power supply and the first drive circuit. The first drive circuit starts to drive the first motor at a timing different from a timing at which the voltage converter starts the voltage conversion.

Preferably, the voltage converter performs a voltage step-up operation of stepping up a power supply voltage to an arbitrary level and outputs the stepped-up voltage, and the first drive circuit starts to drive the first motor in powering mode after the voltage converter starts the voltage step-up operation.

Preferably, the first drive circuit starts to drive the first motor in powering mode after the voltage step-up operation is completed.

Preferably, the first drive circuit receives, after the voltage step-up operation is completed, a required power of the first motor and starts to drive the first motor in powering mode.

Preferably, the first drive circuit holds in advance a relation between temperature of the power supply and an electric power level that can be output from the power supply, and determines a timing at which the first motor is started to be driven, based on the temperature of the power supply.

Preferably, when the temperature of the power supply is lower than a first predetermined threshold or the temperature of the power supply is higher than a second predetermined threshold, the first drive circuit receives the required power of the first motor after the voltage step-up operation is completed, and starts to drive the first motor in powering mode.

Preferably, a predetermined delay time is provided between a timing at which the voltage step-up operation is completed and a timing at which the first drive circuit starts to drive.

Preferably, the first motor is a motor starting or stopping an internal combustion engine, and the voltage converter starts the voltage step-up operation when an instruction to start the internal combustion engine is output.

Preferably, the motor drive apparatus further includes: target voltage determination means for determining a target voltage of the stepped-up voltage based on the number of revolutions of the first motor; and voltage conversion control means receiving the target voltage determined by the target voltage determination means for controlling the voltage converter to set the stepped-up voltage to the target voltage. Receiving the instruction to start the internal combustion engine, the voltage conversion control means controls the voltage converter to obtain a predetermined stepped-up voltage that is necessary for starting the internal combustion engine, regardless of the determined target voltage.

Preferably, the predetermined stepped-up voltage is a maximum voltage of the motor drive apparatus.

Preferably, the voltage conversion control means determines a voltage step-up rate so that electric power required for the voltage step-up operation is within the electric power level that can be output from the power supply, and the power supply voltage is stepped up to the predetermined stepped-up voltage at the determined voltage step-up rate.

Preferably, the voltage conversion control means holds in advance a relation between temperature of the power supply and the electric power level that can be output from the power supply, and determines the voltage step-up rate based on the temperature of the power supply.

Preferably, the motor drive apparatus further includes a second drive circuit provided in parallel with the first drive circuit, and receiving the stepped-up voltage to drive a second motor. The target voltage determination means determines the target voltage based on the number of revolutions of the first motor or the second motor. When the second motor drives a vehicle and an instruction to start the internal combustion engine is issued, the voltage conversion control means controls the voltage converter to obtain the predetermined stepped-up voltage before the internal combustion engine is started.

Preferably, the predetermined stepped-up voltage is a maximum voltage of the motor drive apparatus.

Preferably, the voltage conversion control means determines a voltage step-up rate so that electric power required for the voltage step-up operation is within the electric power level that can be output from the power supply, and steps up the power supply voltage at the determined voltage step-up rate to the predetermined stepped-up voltage.

Preferably, the voltage conversion control means holds in advance a relation between temperature of the power supply and the electric power level that can be output from the power supply, and determines the voltage step-up rate based on the temperature of the power supply.

Preferably, after the first drive circuit starts to drive the first motor in regenerative mode, the voltage converter starts a voltage step-down operation.

Preferably, the voltage converter starts the voltage step-down operation after the first drive circuit drives the first motor in the regenerative mode and stops the first motor.

Preferably, the voltage converter holds in advance a relation between temperature of the power supply and an electric power level that can be input to the power supply, and determines a timing at which the voltage step-down operation is started, based on the temperature of the power supply.

Preferably, when the temperature of the power supply is lower than a first predetermined threshold or higher than a second predetermined threshold, the first drive circuit starts the voltage step-down operation after stopping said first motor.

Preferably, a predetermined delay time is provided between a timing at which the first motor is stopped and a timing at which the voltage step-down operation is started.

Preferably, the motor drive apparatus further includes: target voltage determination means for determining a target voltage of an output voltage of the voltage converter based on the number of revolutions of the first motor; and voltage conversion control means receiving the target voltage determined by the target voltage determination means for controlling the voltage converter to set the output voltage to the target voltage. When an instruction to stop the internal combustion engine is output, the first drive circuit starts to drive the first motor in the regenerative mode. The voltage converter starts the voltage step-down operation in response to completion of the stoppage of the internal combustion engine.

Preferably, in response to the stoppage of the internal combustion engine, the voltage conversion control means determines a voltage step-down rate so that electric power generated by the voltage step-down operation is within an electric power level that can be input to the power supply, and controls the voltage converter to obtain the target voltage at the determined voltage step-down rate.

Preferably, the voltage conversion control means holds in advance a relation between temperature of the power supply and the electric power level that can be input to the power supply, and determines the voltage step-down rate based on the temperature of the power supply.

Preferably, the motor drive apparatus further includes a second drive circuit provided in parallel with the first drive circuit and receiving the output voltage to drive a second motor. The target voltage determination means determines the target voltage based on the number of revolutions of the first motor or the second motor. When the second motor drives a vehicle and an instruction to stop the internal combustion engine is issued, the voltage conversion control means controls the voltage converter to obtain the target voltage after the internal combustion engine is stopped.

The motor drive apparatus of the present invention drives the first motor in powering mode after the voltage converter starts the voltage step-up operation. Therefore, after electric power is taken from the power supply for the voltage step-up operation, electric power is taken from the power supply for driving the first motor.

Further, in the case where the battery output is small, receiving required power of the first motor after the voltage converter completes the voltage step-up operation, the motor drive apparatus of the present invention starts to drive the first motor in powering mode. Therefore, the timing at which the electric power is taken from the power supply for the voltage step-up operation and the timing at which the electric power is taken from the power supply for driving the first motor are separated from each other.

Further, in the motor drive apparatus of the present invention, the voltage converter starts the voltage step-down operation after the first motor is driven in regenerative mode. Therefore, the electric power generated by driving the first motor is brought into the power supply at a timing different from the timing at which electric power generated by the voltage step-down operation is brought thereinto.

In the particular case where the battery output is small, the motor drive apparatus of the present invention uses the voltage converter to start the voltage step-down operation after the operation of stopping the first motor is completed. Therefore, the electric power generated by the first motor and the electric power generated through the voltage step-down operation are separately brought into the power supply.

As seen from the above, the present invention can prevent excessive electric power from being input/output to/from the power supply.

BRIEF DESCRIPTION OF THE DRAWINGS

FIG. 17 is a timing chart of signals and voltage in the case where a motor generator coupled to an engine shown in FIG. 14 is driven in powering mode.

BEST MODES FOR CARRYING OUT THE INVENTION

Figure 1:
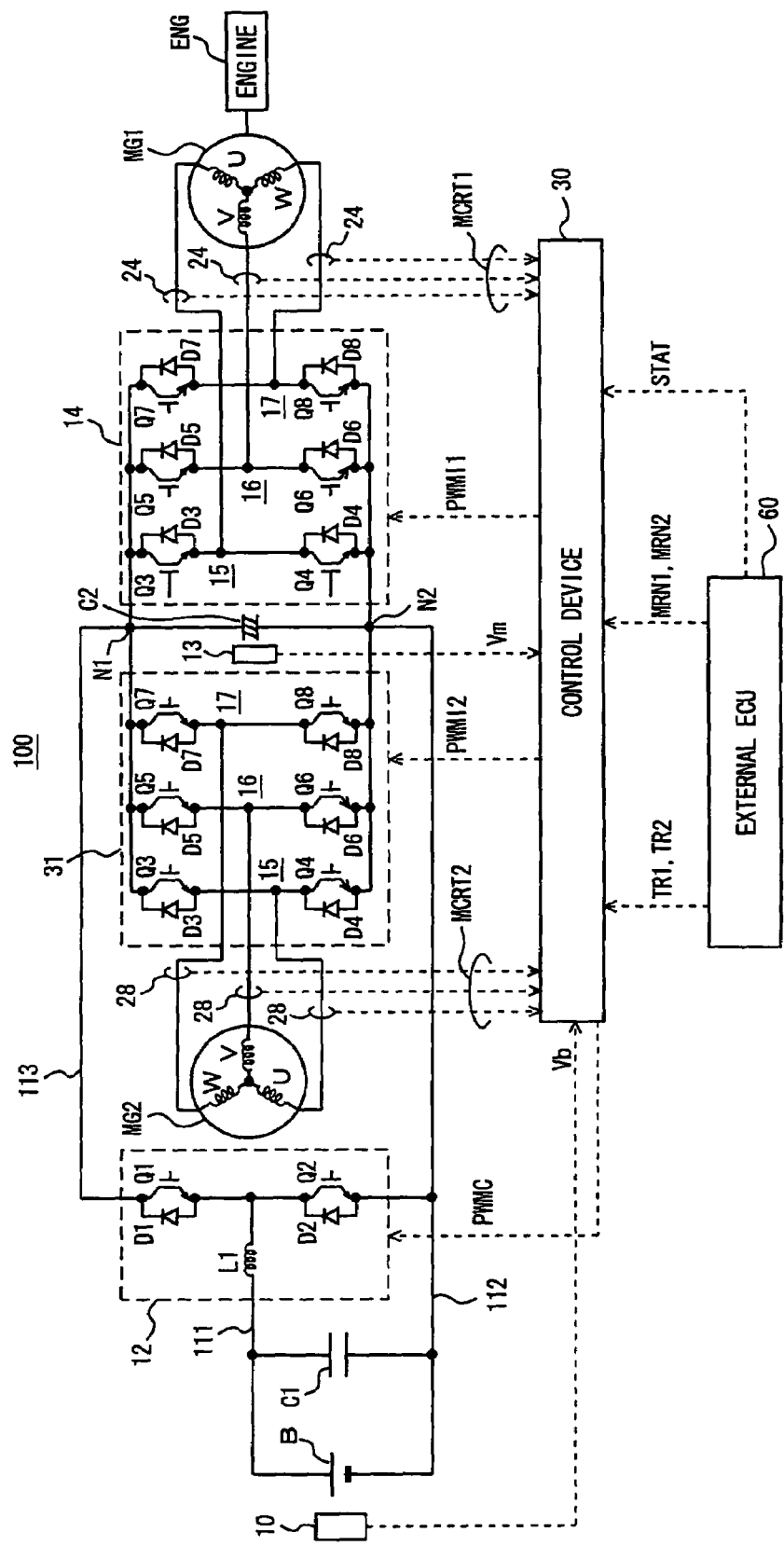
FIG. 1 is a schematic diagram of a motor drive apparatus according to a first embodiment of the present invention.

Embodiments of the present invention are described in detail with reference to the drawings. It is noted that like or corresponding components in the drawings are denoted by like reference characters and a description thereof is not repeated.

First Embodiment

FIG. 1 is a schematic diagram of a motor drive apparatus according to a first embodiment of the present invention. Referring to FIG. 1, motor drive apparatus 100 in the first embodiment of the present invention includes a battery B, capacitors C1, C2, voltage sensors 10, 13, a voltage step-up converter 12, inverters 14, 31, current sensors 24, 28, and a control device 30.

A motor generator MG1 is coupled to an engine ENG mounted on a hybrid vehicle. Motor generator MG1 functions as an electric generator that generates an AC voltage from a rotational force from engine ENG and also functions as an electric motor that starts engine ENG. Further, a motor generator MG2 is a drive motor for generating torque for driving drive wheels of the hybrid vehicle.

Battery B is connected between a power supply line 111 and a negative bus 112 of inverters 14, 31. Capacitor C1 is connected between power supply line 111 and negative bus 112 and in parallel with battery B. Capacitor C2 is connected between a positive bus 113 and negative bus 112 of inverters 14, 31.

Voltage step-up converter 12 includes a reactor L1, NPN transistors Q1, Q2 and diodes D1, D2. Reactor L1 has one end connected to power supply line 111 of battery B and the other end connected to an intermediate point between NPN transistor Q1 and NPN transistor Q2, namely between the emitter of NPN transistor Q1 and the collector of NPN transistor Q2. NPN transistors Q1, Q2 are connected in series between positive bus 113 and negative bus 112. NPN transistor Q1 has its collector connected to positive bus 113 and NPN transistor Q2 has its emitter connected to negative bus 112. Further, between respective collectors and emitters of NPN transistors Q1, Q2, diodes D1, D2 for flowing electric current from the emitters to the collectors are connected.

Inverters 14, 31 are connected in parallel between a node N1 and a node N2.

Inverter 14 is comprised of a U phase arm 15, a V phase arm 16 and a W phase arm 17. U phase arm 15, V phase arm 16 and W phase arm 17 are connected in parallel between positive bus 113 and negative bus 112.

U phase arm 15 is comprised of series-connected NPN transistors Q3, Q4, V phase arm 16 is comprised of series-connected NPN transistors Q5, Q6 and W phase arm 17 is comprised of series-connected NPN transistors Q7, Q8. Further, between respective collectors and emitters of NPN transistors Q3 to Q8, diodes D3 to D8 for flowing electric current from the emitters to the collectors are respectively connected.

The intermediate point of each phase arm is connected to one end of a corresponding one of phase coils of motor generator MG1. Namely, motor generator MG1 is a three-phase permanent-magnet motor and, one end of a U phase coil, one end of a V phase coil and one end of a W phase coil are connected at the common central junction, while the other end of the U phase coil is connected to an intermediate point between NPN transistors Q3, Q4, the other end of the V phase coil is connected to an intermediate point between NPN transistors Q5, Q6, and the other end of the W phase coil is connected to an intermediate point between NPN transistors Q7, Q8.

Inverter 31 is configured identically to inverter 14. The intermediate point of each phase arm of inverter 31 is connected to one end of a corresponding one of phase coils of motor generator MG2. Namely, motor generator MG2 is also a three-phase permanent-magnet motor and, one end of a U phase coil, one end of a V phase coil and one end of a W phase coil are connected at the common central junction, while the other end of the U phase coil is connected to an intermediate point between NPN transistors Q3, Q4 of inverter 31, the other end of the V phase coil is connected to an intermediate point between NPN transistors Q5, Q6 of inverter 31, and the other end of the W phase coil is connected to an intermediate point between NPN transistors Q7, Q8 of inverter 31.

Battery B is comprised of a secondary or rechargeable cell, for example, of nickel hydride or lithium ion. Voltage sensor 10 detects DC voltage Vb that is output from battery B to output the detected DC voltage Vb to control device 30. Capacitor C1 smoothes the DC voltage that is output from battery B to supply the smoothed DC voltage to voltage step-up converter 12.

Voltage step-up converter 12 steps up the DC voltage supplied from capacitor C1 to generate a resultant stepped-up voltage having an arbitrary level and supply the resultant voltage to capacitor C2. More specifically, receiving signal PWMC from control device 30, voltage step-up converter 12 steps up the DC voltage according to a period of time during which NPN transistor Q2 is made on by signal PWMC to supply the resultant voltage to capacitor C2. In this case, NPN transistor Q1 is made off by signal PWMC.

Further, according to signal PWMC from control device 30, voltage step-up converter 12 steps down a DC voltage supplied from inverter 14 (or inverter 31) through capacitor C2 to charge battery B.

Capacitor C2 smoothes the DC voltage stepped up by voltage step-up converter 12 to supply the smoothed DC voltage through nodes N1, N2 to inverters 14, 31. Thus, capacitor C2 receives the DC voltage stepped up by voltage step-up converter 12, smoothes the received DC voltage and supplies the resultant voltage to inverters 14, 31.

Voltage sensor 13 detects terminal-to-terminal voltage Vm of capacitor C2 (corresponding to an input voltage to inverters 14, 31, which is applied as well to the description hereinlater) to output the detected voltage Vm to control device 30.

Receiving a DC voltage from voltage step-up converter 12 through nodes N1, N2 and capacitor C2, inverter 14 converts the DC voltage into an AC voltage based on signal PWMI1 from control device 30 to drive motor generator MG1. Thus, motor generator MG1 is driven to generate torque designated by torque command value TR1. Further, in regenerative braking mode of the hybrid vehicle having motor drive apparatus 100 mounted thereon, inverter 14 converts an AC voltage generated by motor generator MG1 into a DC voltage based on signal PWMI1 from control device 30, and supplies the DC voltage as converted, through capacitor C2 and nodes N1, N2 to voltage step-up converter 12.

Receiving a DC voltage from voltage step-up converter 12 through nodes N1, N2 and capacitor C2, inverter 31 converts the DC voltage into an AC voltage based on signal PWMI2 from control device 30 to drive motor generator MG2. Thus, motor generator MG2 is driven to generate torque designated by torque command value TR2. Further, in regenerative braking mode of the hybrid vehicle having motor drive apparatus 100 mounted thereon, inverter 31 converts an AC voltage generated by motor generator MG2 into a DC voltage based on signal PWMI2 from control device 30, and supplies the DC voltage as converted, through capacitor C2 and nodes N1, N2 to voltage step-up converter 12.

The regenerative braking here includes braking accompanied by regenerative electric-power generation that is effected when a driver of the hybrid vehicle steps on the foot brake as well as deceleration (or stop of acceleration) accompanied by regenerative electric-power generation that is effected when the driver releases the accelerator pedal without operating the foot brake.

Current sensor 24 detects motor current MCRT1 flowing through motor generator MG1 and outputs the detected motor current MCRT1 to control device 30. Further, current sensor 28 detects motor current MCRT2 flowing through motor generator MG2 and outputs the detected motor current MCRT2 to control device 30.

Control device 30 receives, from an external ECU (Electrical Control Unit) 60, torque command values TR1, TR2, motor revolution number (the number of revolutions of the motor) MRN1, motor revolution number MRN2, and signal STAT, receives DC voltage Vb from voltage sensor 10, receives output voltage Vm from voltage sensor 13, receives motor current MCRT1 from current sensor 24, and receives motor current MCRT2 from current sensor 28.

Signal STAT is a signal for instructing to start/stop engine ENG and has H (logical high) level and L (logical low) level. Signal STAT of H level is a signal for instructing to start engine ENG and signal STAT of L level is a signal for instructing to stop engine ENG.

Control device 30 generates, based on output voltage Vm, motor current MCRT1 and torque command value TR1, signal PWMI1 for controlling switching of NPN transistors Q3 to Q8 of inverter 14 when inverter 14 drives motor generator MG1 according to a method hereinlater described.

Further, control device 30 generates, based on output voltage Vm, motor current MCRT2 and torque command value TR2, signal PWMI2 for controlling switching of NPN transistors Q3 to Q8 of inverter 31 when inverter 31 drives motor generator MG2 according to a method hereinlater described.

Furthermore, control device 30 generates, when inverter 14 (or 31) drives motor generator MG1 (or motor generator MG2), signal PWMC for controlling switching of NPN transistors Q1, Q2 of voltage step-up converter 12 by a method described hereinlater, based on DC voltage Vb, output voltage Vm, torque command value TR1 (or TR2) and motor revolution number MRN1 (or MRN2).

Then, when control device 30 receives signal STAT of L level from external ECU 60 to generate signals PWMI1, PWMI2 and PWMC, control device 30 outputs, without adjusting the timing of the output, the generated signals PWMI1, PWMI2 and PWMC respectively to inverter 14, inverter 31 and voltage step-up converter 12.

Further, when control device 30 receives signal STAT of H level from external ECU 60 to generate signals PWMI1, PWMI2 and PWMC, control device 30 outputs, with an adjustment made to the output timing, the generated signals PWMI1, PWMI2 and PWMC respectively to inverter 14, inverter 31 and voltage step-up converter 12.

The output timing is adjusted as follows. Signal PWMC is firstly output to voltage step-up converter 12 to control voltage step-up converter 12 so that the converter steps up DC voltage Vb and, after voltage step-up converter 12 completes the voltage step-up operation, signals PWMI1, PWMI2 are output respectively to inverters 14, 31.

Figure 2:
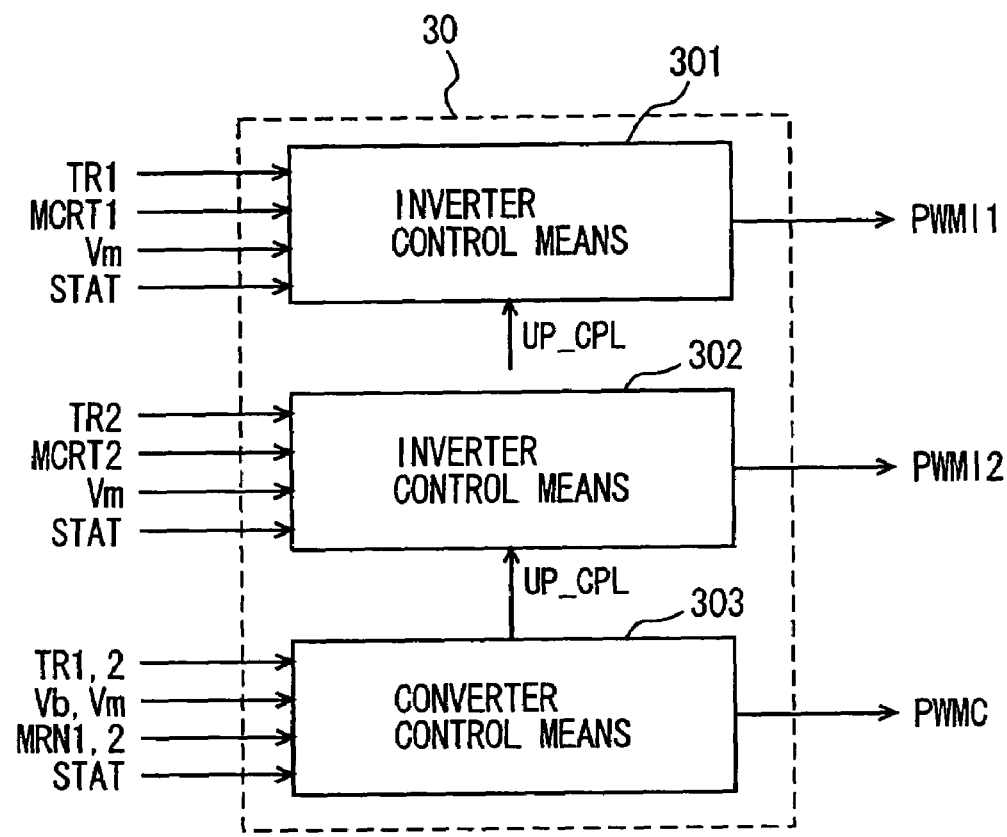
FIG. 2 is a functional block diagram of a control device shown in FIG. 1.

FIG. 2 is a functional block diagram of control device 30 shown in FIG. 1. Referring to FIG. 2, control device 30 includes inverter control means 301, 302 and converter control means 303.

Inverter control means 301 receives torque command value TR1 and signal STAT from external ECU 60, receives motor current MCRT1 from current sensor 24, receives voltage Vm from voltage sensor 13, and receives signal UP_CPL from converter control means 303. Signal UP_CPL is a signal indicating that voltage step-up operation by voltage step-up converter 12 is completed.

Inverter control means 301 generates, based on torque command value TR1, motor current MCRT1 and voltage Vm, signal PWMI1 according to a method described hereinlater. Receiving signal STAT of L level from external ECU 60, inverter control means 301 outputs the generated signal PWMI1 to inverter 14 without adjusting the output timing. In contrast, receiving signal STAT of H level from external ECU 60, inverter control means 301 outputs signal PWMI1 to inverter 14, not simultaneously with the generation of signal PWMI1, but after receiving signal UP_CPL from converter control means 303.

Inverter control means 302 receives torque command value TR2 and signal STAT from external ECU 60, receives motor current MCRT2 from current sensor 28, receives voltage Vm from voltage sensor 13, and receives signal UP_CPL from converter control means 303.

Inverter control means 302 generates, based on torque command value TR2, motor current MCRT2 and voltage Vm, signal PWMI2 according to a method described hereinlater. Receiving signal STAT of L level from external ECU 60, inverter control means 302 outputs the generated signal PWMI2 to inverter 31 without adjusting the output timing. In contrast, receiving signal STAT of H level from external ECU 60, inverter control means 302 outputs signal PWMI2 to inverter 31, not simultaneously with the generation of signal PWMI2, but after receiving signal UP_CPL from converter control means 303.

Converter control means 303 receives, from external ECU 60, torque command values TR1, 2, motor revolution numbers MRN1, 2 and signal STAT, receives DC voltage Vb from voltage sensor 10 and receives voltage Vm from voltage sensor 13. Receiving signal STAT of L level from external ECU 60, converter control means 303 calculates a target voltage for stepping up DC voltage Vb, based on the torque command value and motor revolution number of one of motor generators MG1 and MG2 that has a higher drive voltage, generates signal PWMC for setting output voltage Vm of voltage step-up converter 12 to the calculated target voltage, and outputs the generated signal to voltage step-up converter 12.

In other words, when motor generator MG1 has its drive voltage higher than that of motor generator MG2, converter control means 303 calculates a target voltage based on torque command value TR1 and motor revolution number MRN1 of motor generator MG1 and, based on the calculated target voltage, DC voltage Vb and output voltage Vm, generates signal PWMC for stepping up DC voltage Vb to output voltage Vm that is equal to the target voltage to output the generated signal to voltage step-up converter 12.

Further, when motor generator MG2 has its drive voltage higher than that of motor generator MG1, converter control means 303 calculates a target voltage based on torque command value TR2 and motor revolution number MRN2 of motor generator MG2 and, based on the calculated target voltage, DC voltage Vb and output voltage Vm, generates signal PWMC for stepping up DC voltage Vb to output voltage Vm that is equal to the target voltage to output the generated signal to voltage step-up converter 12.

In contrast, receiving signal STAT of H level from external ECU 60, converter control means 303 determines a target voltage for stepping up DC voltage Vb regardless of respective drive voltages of motor generators MG1, MG2 and, based on the determined target voltage, DC voltage Vb and output voltage Vm, generates signal PWMC for stepping up DC voltage Vb to output voltage Vm that is equal to the target voltage to output the generated signal to voltage step-up converter 12. When output voltage Vm is set to the target voltage, namely the voltage step-up operation by voltage step-up converter 12 is completed, converter control means 303 generates signal UP_CPL indicative of the completion of the voltage step-up operation to output the generated signal to inverter control means 301, 302. In this case, the target voltage is set to the maximum voltage of motor drive apparatus 100.

Figure 3:
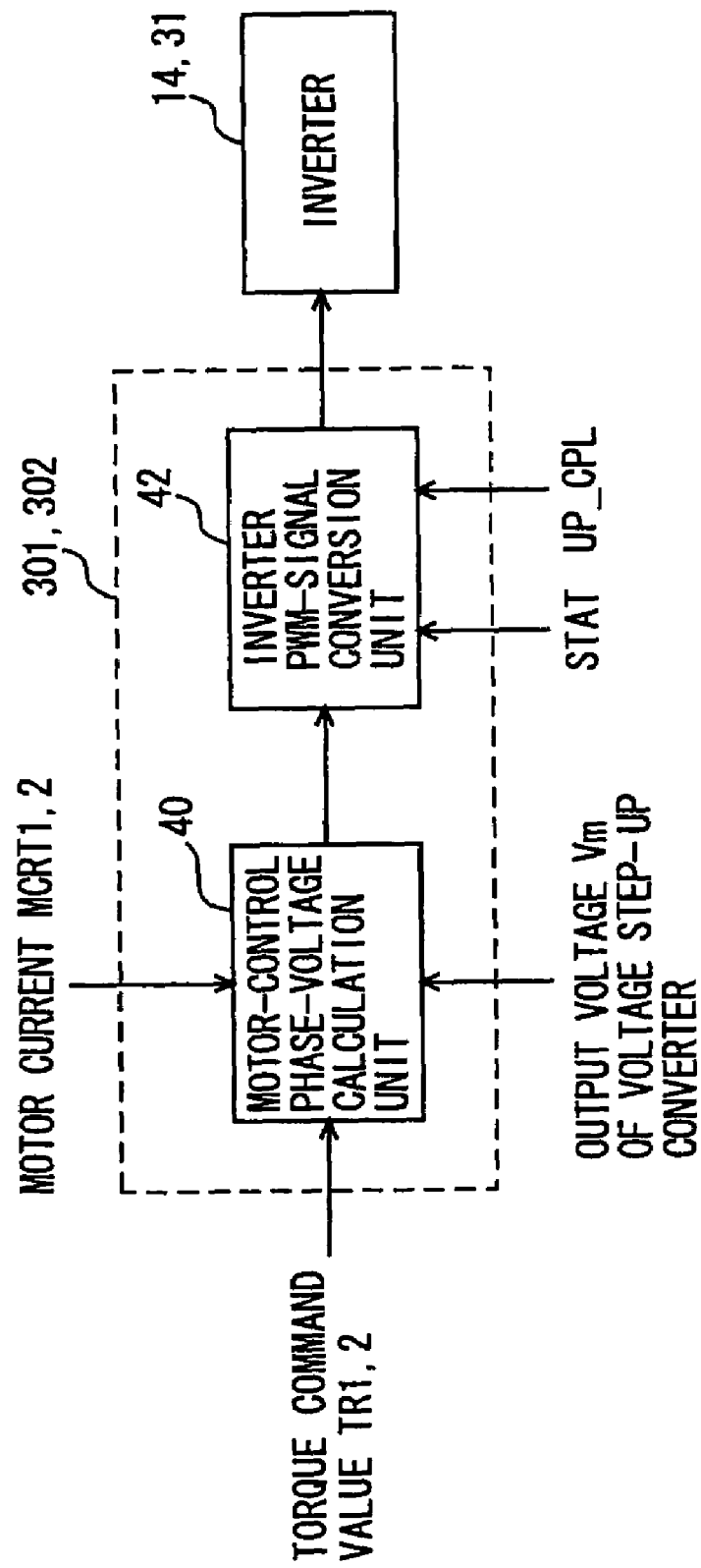
FIG. 3 is a functional block diagram of inverter control means shown in FIG. 2.

FIG. 3 is a functional block diagram of inverter control means 301, 302 shown in FIG. 2. Referring to FIG. 3, inverter control means 301, 302 include a motor-control phase-voltage calculation unit 40 and an inverter PWM-signal conversion unit 42.

Motor-control phase-voltage calculation unit 40 receives torque command values TR1, 2 from external ECU 60, receives output voltage Vm of voltage step-up converter 12 from voltage sensor 13, namely the input voltage to inverters 14, 31, receives from current sensor 24 motor current MCRT1 flowing through each phase of motor generator MG1, and receives from current sensor 28 motor current MCRT2 flowing through each phase of motor generator MG2. Based on output voltage Vm, torque command value TR1 (or TR2) and motor current MCRT1 (or MCRT2), motor-control phase-voltage calculation unit 40 calculates a voltage to be applied to each phase coil of motor generator MG1 (or motor generator MG2) and outputs the calculated voltage to inverter PWM-signal conversion unit 42.

Based on the calculated voltage from motor-control phase-voltage calculation unit 40, inverter PWM-signal conversion unit 42 generates signal PWMI1 (or signal PWMI2) for actually turning on/off NPN transistors Q3 to Q8 each of inverter 14 (or inverter 31). Receiving signal STAT of L level from external ECU 60, inverter PWM-signal conversion unit 42 outputs the generated signal PWMI1 (or signal PWMI2) to NPN transistors Q3 to Q8 each of inverter 14 (or inverter 31) without adjusting the output timing.

Accordingly, switching of NPN transistors Q3 to Q8 each is controlled and current to be flown through each phase of motor generator MG1 (or motor generator MG2) is controlled so that motor generator MG1 (or motor generator MG2) outputs torque as instructed. Thus, the motor control current is controlled and motor torque is output according to torque command value TR1 (or TR2).

In contrast, receiving signal STAT of H level from external ECU 60, inverter PWM-signal conversion unit 42 outputs the generated signal PWMI1 (or signal PWMI2) to NPN transistors Q3 to Q8 each of inverter 14 (or inverter 31), not simultaneously with the generation of the signal but after receiving signal UP_CPL from converter control means 303.

Accordingly, after the voltage step-up operation by voltage step-up converter 12 is completed, inverter 14 (or inverter 31) drives motor generator MG1 (or MG2) according to signal PWMI1 (or signal PWMI2).

Whether inverter 14 drives, according to signal PWMI1, motor generator MG1 in powering (electric motor) mode, or regenerative (electric generator) mode, is determined by motor revolution number MRN1 and torque command value TR1. Specifically, it is supposed here that the x-axis of a rectangular coordinate system indicates the motor revolution number and the y-axis thereof indicates the torque command value. Then, if a correlated set of motor revolution number MRN1 and torque command value TR1 is in the first or second quadrant, motor generator MG1 is in powering mode. If a correlated set of motor revolution number MRN1 and torque command value TR1 is in the third or fourth quadrant, motor generator MG1 is in regenerative mode. Accordingly, when motor-control phase-voltage calculation unit 40 receives, from external ECU 60, motor revolution number MRN1 and torque command value TR1 that are in the first or second quadrant, inverter PWM-signal conversion unit 42 generates signal PWMI1 for driving motor generator MG1 in powering mode. When motor-control phase-voltage calculation unit 40 receives, from external ECU 60, motor revolution number MRN1 and torque command value TR1 that are in the third or fourth quadrant, inverter PWM-signal conversion unit 42 generates signal PWMI1 for driving motor generator MG1 in regenerative mode.

Whether inverter 31 drives, according to signal PWMI2, motor generator MG2 in powering mode or regenerative mode is also determined in the same manner as the above-described one.

Figure 4:
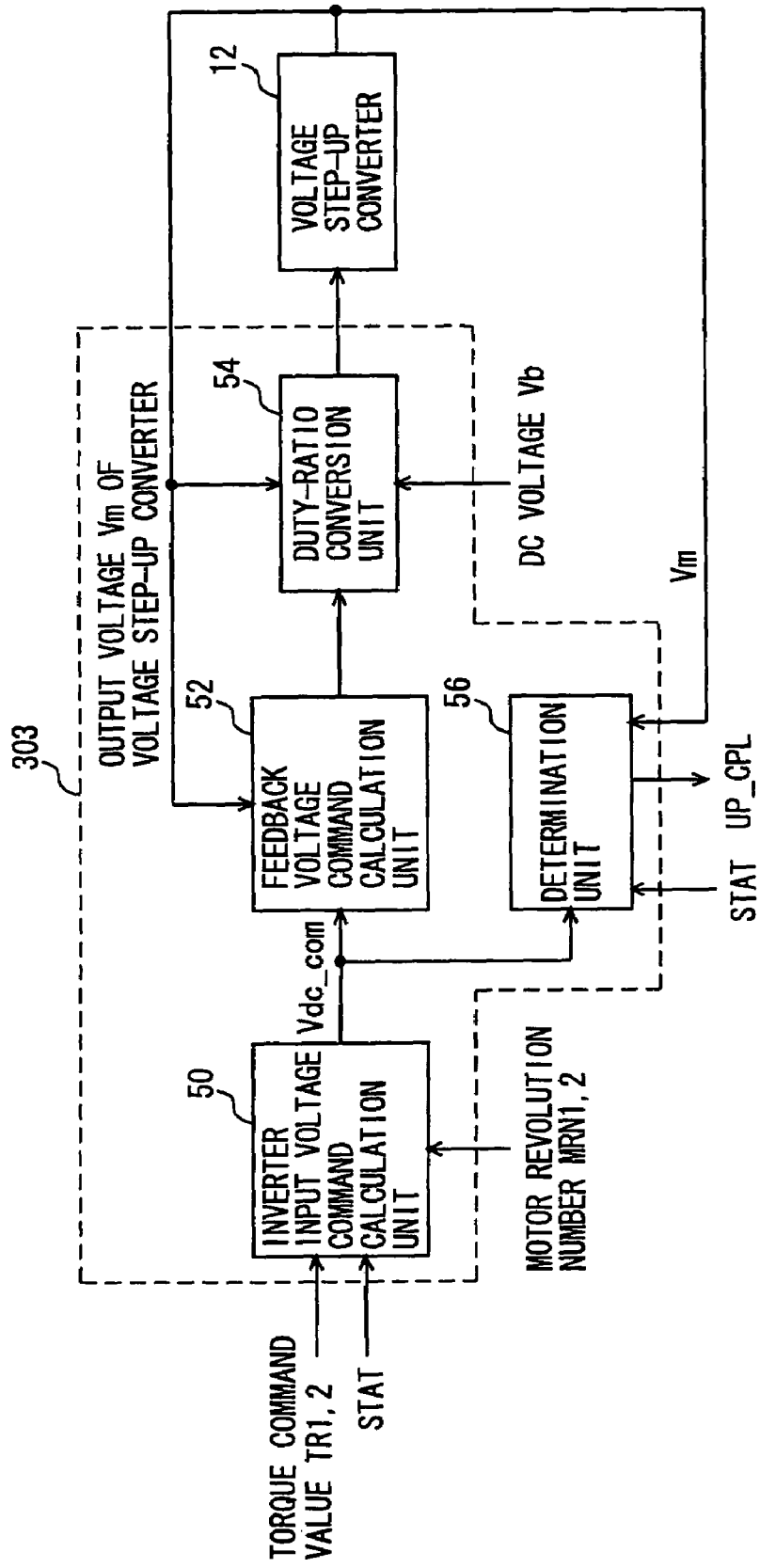
FIG. 4 is a functional block diagram of converter control means shown in FIG. 2.

FIG. 4 is a functional block diagram of converter control means 303 shown in FIG. 2. Referring to FIG. 4, converter control means 303 includes inverter input voltage command calculation unit 50, a feedback voltage command calculation unit 52, a duty-ratio conversion unit 54, and a determination unit 56.

Inverter input voltage command calculation unit 50 receives from external ECU 60 torque command values TR1, 2, motor revolution numbers MRN1, 2 and signal STAT. Receiving signal STAT of L level from external ECU 60, inverter input voltage command calculation unit 50 calculates, based on the torque command value and the motor revolution number of one of motor generators MG1 and MG2 that is higher in drive voltage, an optimum value (target value) of the inverter input voltage, namely voltage command Vdc_com (corresponding to a target voltage of output voltage Vm, which is applied as well to the following description).

Specifically, when motor generator MG1 has its drive voltage higher than that of motor generator MG2, inverter input voltage command calculation unit 50 calculates voltage command Vdc_com based on torque command value TR1 and motor revolution number MRN1. When motor generator MG2 has its drive voltage higher than that of motor generator MG1, inverter input voltage command calculation unit 50 calculates voltage command Vdc_com based on torque command value TR2 and motor revolution number MRN2. Then, inverter input voltage command calculation unit 50 outputs the calculated voltage command Vdc_com to feedback voltage command calculation unit 52 and determination unit 56.

Thus, receiving signal STAT of L level from external ECU 60, inverter input voltage command calculation unit 50 calculates a target voltage (voltage command Vdc_com) based on the motor revolution number of one of motor generators that has a higher drive voltage (one of motor generators MG1 and MG2).

In contrast, receiving signal STAT of H level from external ECU 60, inverter input voltage command calculation unit 50 determines that voltage command Vdc_com (target voltage) is maximum voltage Vmax of motor drive apparatus 100, regardless of torque command values TR1, TR2 and motor revolution numbers MRN1, MRN2, and outputs the determined voltage command Vdc_com to feedback voltage command calculation unit 52 and determination unit 56. It is noted that inverter input voltage command calculation unit 50 holds maximum voltage Vmax.

Feedback voltage command calculation unit 52 receives output voltage Vm of voltage step-up converter 12 from voltage sensor 13 and receives voltage command Vdc_com from inverter input voltage command calculation unit 50. Based on output voltage Vm and voltage command Vdc_com, feedback voltage command calculation unit 52 calculates feedback voltage command Vdc_com_fb for setting output voltage Vm to voltage command Vdc_com, and outputs the calculated feedback voltage command Vdc_com_fb to duty-ratio conversion unit 54.

Duty-ratio conversion unit 54 receives DC voltage Vb from voltage sensor 10 and receives output voltage Vm from voltage sensor 13. Based on DC voltage Vb, output voltage Vm and feedback voltage command Vdc_com_fb, duty-ratio conversion unit 54 calculates duty ratio DR for setting output voltage Vm to feedback voltage command Vdc_com_fb and, based on the calculated duty ratio DR, generates signal PWMC for turning on/off NPN transistors Q1, Q2 of voltage step-up converter 12. Duty-ratio conversion unit 54 outputs the generated signal PWMC to NPN transistors Q1, Q2 of voltage step-up converter 12.

Accordingly, voltage step-up converter 12 converts DC voltage Vb into output voltage Vm so that output voltage Vm is equal to target voltage (voltage command Vdc_com).

It is noted that a higher on-duty of the lower NPN transistor Q2 of voltage step-up converter 12 allows larger electric power to be stored in reactor L1, which means that a higher-voltage output can be obtained. In contrast, a higher on-duty of the upper NPN transistor Q1 causes the voltage of the positive bus to decrease. Thus, the duty ratio of NPN transistors Q1, Q2 can be controlled so that the voltage of the positive bus is controlled to be equal to an arbitrary voltage of at least the output voltage of battery B.

Determination unit 56 receives voltage command Vdc_com from inverter input voltage command calculation unit 50, receives signal STAT from external ECU 60 and receives voltage Vm from voltage sensor 13. When determination unit 56 receives signal STAT of L level from external ECU 60, the determination unit stops operating. Further, receiving signal STAT of H level from external ECU 60, determination unit 56 determines whether or not voltage Vm received from voltage sensor 13 reaches voltage command Vdc_com (target voltage=voltage Vmax) received from inverter input voltage command calculation unit 50. When determination unit 56 determines that voltage Vm reaches voltage command Vdc_com (=Vmax), the determination unit generates signal UP_CPL to output the generated signal to inverter control means 301, 302.

As discussed above, according to the present invention, receiving signal STAT of L level from external ECU 60, inverter control means 301, 302 output the generated signals PWMI1, PWMI2 respectively to inverters 14, 31 without adjusting the output timing. Receiving signal STAT of H level from external ECU 60, inverter control means 301, 302 output the generated signals PWMI1, PWMI2 to inverters 14, 31 after the voltage step-up operation by voltage step-up converter 12 is completed.

In other words, receiving signal STAT of L level from external ECU 60, control device 30 drives and controls voltage step-up converter 12 and inverters 14, 31 without adjusting the operation timing. Receiving signal STAT of H level from external ECU 60, control device 30 drives and controls voltage step-up converter 12 so that the converter performs voltage step-up operation and, after the voltage step-up operation of voltage step-up converter 12 is completed, drives and controls inverters 14, 31.

Figure 5:
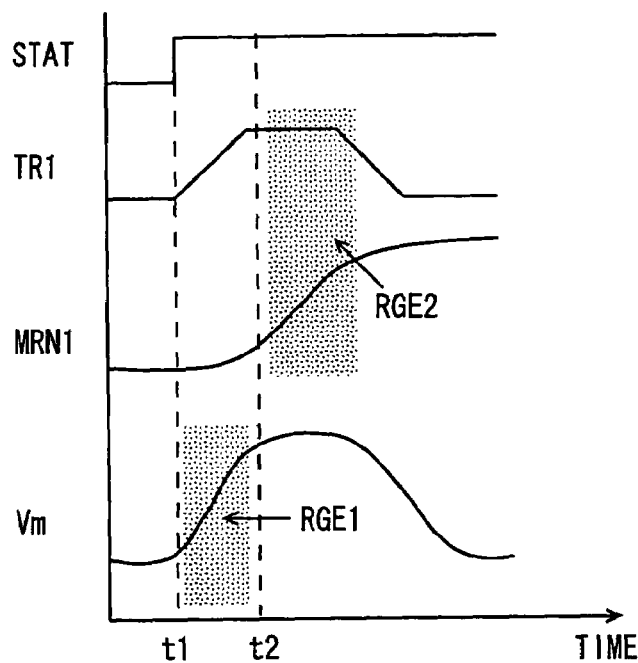
FIG. 5 is a timing chart of signals and voltage in the case where a motor generator coupled to an engine shown in FIG. 1 is driven.

FIG. 5 is a timing chart of signals and voltage in the case where motor generator MG1 coupled to engine ENG shown in FIG. 1 is driven. Referring to FIG. 5, in the case where the present invention is applied, when signal STAT changes from L level to H level at timing t1, namely when an instruction to start engine ENG is given, converter control means 303 generates signal PWMC according to the above-described method to output the signal to voltage step-up converter 12, and drives and controls voltage step-up converter 12 so that DC voltage Vb is stepped up to maximum voltage Vmax of motor drive apparatus 100 regardless of respective drive voltages of motor generators MG1, MG2.

Then, voltage step-up converter 12 starts the voltage step-up operation for stepping up DC voltage Vb to maximum voltage Vmax, according to signal PWMC. Output voltage Vm of voltage step-up converter 12 gradually increases after timing t1 to reach maximum voltage Vmax at around timing t2. When output voltage Vm reaches maximum voltage Vmax, converter control means 303 generates signal UP_CPL indicative of completion of the voltage step-up operation by voltage step-up converter 12 to output the generated signal to inverter control means 301.

After timing t1, torque command value TR1 increases. At timing t2 at which converter control means 303 outputs signal UP_CPL to inverter control means 301, torque command value TR1 increases to a predetermined value.

Receiving signal UP_CPL from converter control means 303, inverter control means 301 generates signal PWMI1, according to the above-described method, based on torque command value TR1, motor current MCRT1 and output voltage Vm (=Vmax), and outputs the generated signal PWMI1 to inverter 14. Inverter 14 then converts maximum voltage Vmax as stepped up by voltage step-up converter 12 into an AC voltage according to signal PWMI1, to drive motor generator MG1 in powering mode.

Motor generator MG1 is then driven by inverter 14 and motor revolution number MRN1 sharply increases after timing t2. Motor generator MG1 outputs torque designated by torque command value TR1 to start engine ENG.

As seen from the above, according to the present invention, when an instruction to start engine ENG is given, voltage step-up converter 12 is first driven and controlled and, after the voltage step-up operation by voltage step-up converter 12 is completed, inverter 14 is driven and controlled.

Accordingly, the power that is required for stepping up DC voltage Vb reaches the maximum in region RGE1 that is present between timing t1 and timing t2, while the power that is required for driving motor generator MG1 reaches the maximum in region RGE2 that is present after timing t2. As a result, region RGE1 where the power required for stepping up DC voltage Vb reaches the maximum and region RGE2 where the power required for driving motor generator MG1 reaches the maximum can be provided in respective regions separate from each other, and thus excessive electric power can be prevented from being taken from battery B to voltage step-up converter 12 and inverters 14, 31.

Figure 6:
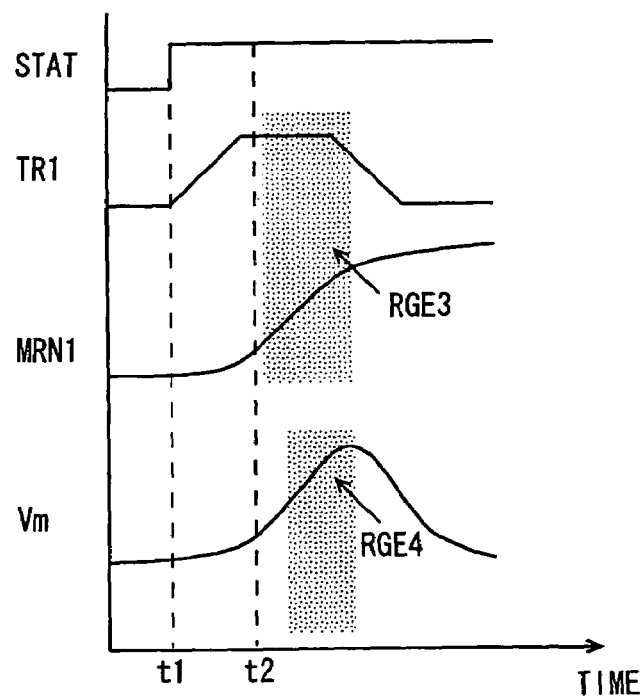
FIG. 6 is another timing chart of signals and voltage in the case where the motor generator coupled to the engine shown in FIG. 1 is driven.

FIG. 6 is another timing chart of signals and voltage in the case where motor generator MG1 coupled to engine ENG shown in FIG. 1 is driven. Referring to FIG. 6, in the case where the present invention is not applied, when signal STAT changes from L level to H level at timing t1 and an instruction to start engine ENG is given, inverter control means 301 generates, based on torque command value TR1, motor current MCRT1 and output voltage Vm, signal PWMI1 according to the aforementioned method to output the generated signal to inverter 14. Further, converter control means 303 generates, based on torque command value TR1, motor revolution number MRN1, DC voltage Vb and output voltage Vm, signal PWMC according to the aforementioned method to output the generated signal to voltage step-up converter 12.

Then, inverter 14 converts, according to signal PWMI1, output voltage Vm from voltage step-up converter 12 into an AC voltage so as to drive motor generator MG1, and voltage step-up converter 12 steps up DC voltage Vb to target voltage Vdc_com (determined based on torque command value TR1 and motor revolution number MRN1) according to signal PWMC.

As a result, the power required for driving motor generator MG1 reaches the maximum in region RGE3 after timing t2 while the power required for stepping up DC voltage Vb reaches the maximum in region RGE4 after timing t2. Therefore, region RGE3 where the power required for driving motor generator MG1 reaches the maximum and region RGE4 where the power required for stepping up DC voltage Vb reaches the maximum overlap each other and accordingly excessive electric power is taken from battery B to voltage step-up converter 12 and inverters 14, 31.

As seen from the above, the present invention can be applied to prevent, when engine ENG is started (cranking), excessive electric power from being taken from battery B to voltage step-up converter 12 and inverters 14, 31.

Figure 7:
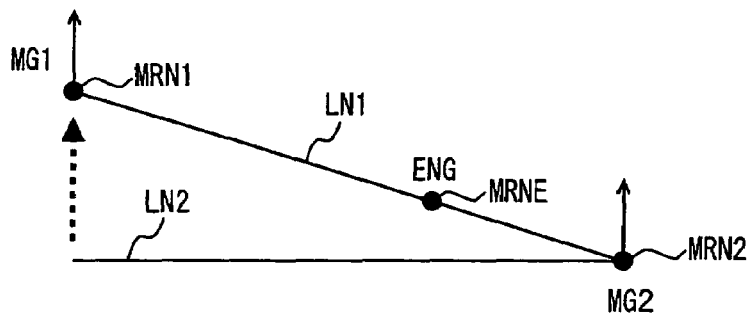
FIG. 7 is a collinear chart representing a cranking operation.

In the case where motor drive apparatus 100 is mounted on a hybrid vehicle, motor generators MG1, MG2 and engine ENG are coupled to each other through a known planetary gear (not shown). FIG. 7 is a collinear chart representing a cranking operation. Referring to FIG. 7, motor revolution number MRN1 of motor generator MG1, motor revolution number MRN2 of motor generator MG2 and engine revolution number MRNE of engine ENG are on straight line LN1 in the case where motor revolution numbers MRN1, MRN2 are arranged on respective sides with engine revolution number MRNE therebetween. Namely, motor revolution numbers MRN1, MRN2 and engine revolution number MRNE change while being located on the straight line all the time.

It is supposed that the region over straight line LN2 is a region where motor generators MG1, MG2 are driven in powering mode and the region under straight line LN2 is a region where motor generators MG1, MG2 are driven in regenerative mode. Then, when engine ENG is started, motor generator MG1 is driven in powering mode and motor revolution number MRN1 is shifted upwardly to a large degree with respect to straight line LN2 as shown in FIG. 7.

Depending on drive conditions, it may be necessary, when an instruction to start engine ENG is given, to drive motor generator MG2 in regenerative mode and start engine ENG. In this case, motor revolution number MRN2 is shifted downwardly with respect to straight line LN2, so that motor revolution number MRN1 is further shifted upwardly with respect to straight line LN2.

Accordingly, when engine ENG is started, motor generator MG1 consumes increased power.

Thus, it is particularly effective to apply the present invention to provide, in different regions respectively, region RGE1 where the power necessary for stepping up DC voltage Vb reaches the maximum and region RGE2 where the power necessary for driving motor generator MG1 reaches the maxim, in order to prevent excessive electric power from being taken from battery B to voltage step-up converter 12 and inverters 14, 31.

Further, in consideration of the case where motor revolution number MRN1 of motor generator MG1 suddenly increases and the power required for driving motor generator MG1 suddenly increases, converter control means 303 determines, upon receiving signal STAT of H level from external ECU 60, that the target voltage is maximum voltage Vmax of motor drive apparatus 100, so that engine ENG can be started even if the power required for driving motor generator MG1 changes in any manner.

Figure 8:
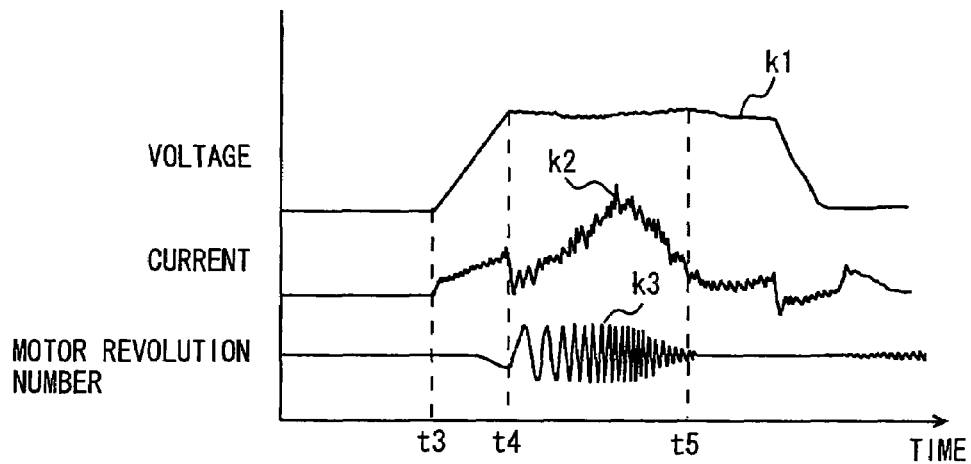
FIG. 8 is a timing chart of DC current, output voltage and motor revolution number in the case where the present invention is applied.

FIG. 8 is a timing chart of DC current I, output voltage Vm and motor revolution number MRN1 in the case where the present invention is applied. Regarding DC current I, the electric current flowing from battery B toward voltage step-up converter 12 is positive current. In FIG. 8, curve k1 represents output voltage Vm of voltage step-up converter 12, curve k2 represents DC current I and curve k3 represents motor revolution number MRN1.

Referring to FIG. 8, output voltage Vm of voltage step-up converter 12 starts to increase at timing t3 to reach target voltage Vdc_com (=Vmax) at timing t4. Thus, in the period from timing t3 to timing t4, the power required for stepping up DC voltage Vb to target voltage Vdc_com (=Vmax) reaches the maximum, and the power of battery B is used as the power required for stepping up DC voltage Vb to target voltage Vdc_com (=Vmax). Motor revolution number MRN1 starts to increase at timing t4 and increases to a large degree as the time passes from timing t4 toward timing t5 (in FIG. 8, a smaller amplitude of the periodic oscillation in the direction of the vertical axis represents a larger revolution number).

Consequently, as the power required for stepping up the voltage by voltage step-up converter 12 reaches the maximum, DC current I increases in the period from timing t3 to timing t4 and temporarily decreases after timing 4. Then, as motor revolution number MRN1 increases after timing t4, namely as the power required for driving motor generator MG1 increases, DC current I increases.

Thus, the present invention can be applied to allow the timing at which DC current I is taken from battery B for stepping up the voltage by voltage step-up converter 12 to be different from the timing at which DC current I is taken from battery B for driving motor generator MG1. Further, DC current I taken from battery B can be within the range of allowable current.

Figure 9:
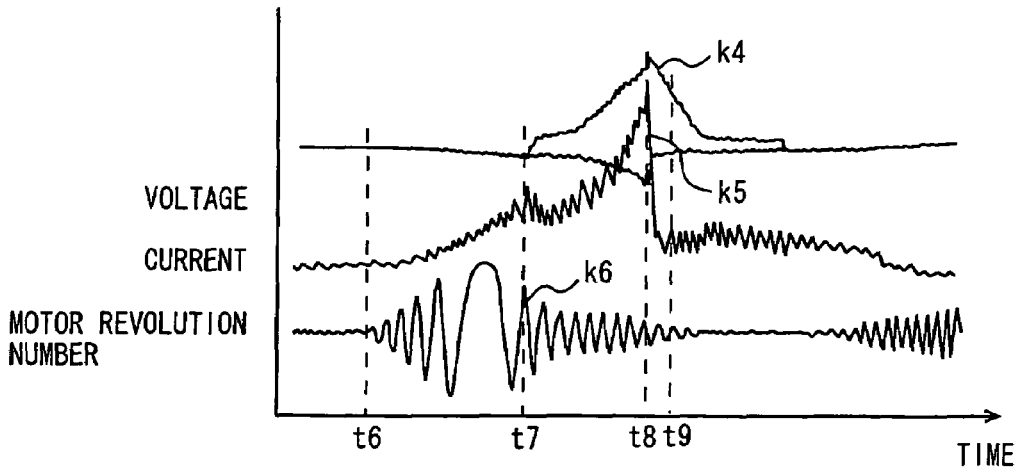
FIG. 9 is a timing chart of DC current, output voltage and motor revolution number in the case where the present invention is not applied.

FIG. 9 is a timing chart of DC current I, output voltage Vm and motor revolution number MRN1 in the case where the present invention is not applied. In FIG. 9, curve k4 represents output voltage Vm of voltage step-up converter 12, curve k5 represents DC current I and curve k6 represents motor revolution number MRN1.

Referring to FIG. 9, motor revolution number MRN1 starts to increase at timing t6, and accordingly an operation of stepping up DC voltage Vb to target voltage Vdc_com (determined by motor revolution number MRN1) is accordingly carried out. At timing t7, output voltage Vm of voltage step-up converter 12 starts to increase to reach the maximum at timing t8. In this case, as the voltage step-up operation is started at timing t6, DC current I starts to increase at timing t6.

Motor revolution number MRN1 increases as the time passes from timing t6 toward timing t9, and suddenly increases particularly after timing t7. Then, after timing t7, DC current I further increases suddenly to reach the maximum at timing t8 at which output voltage Vm of voltage step-up converter 12 reaches the maximum.

As a result, the timing at which DC current I is taken from battery B for the voltage step-up operation by voltage step-up converter 12 and the timing at which DC current I is taken from battery B for driving motor generator MG1 overlap each other so that DC current I taken from battery B exceeds allowable current.

With reference again to FIG. 1, the entire operation of motor drive apparatus 100 is described. As the entire operation starts, voltage sensor 10 detects DC voltage Vb that is output from battery B and outputs the detected DC voltage Vb to control device 30. Further, voltage sensor 13 detects terminal-to-terminal voltage Vm of capacitor C2 and outputs the detected voltage Vm to control device 30. Furthermore, current sensor 24 detects motor current MCRT1 flowing through motor generator MG1 and outputs the detected current to control device 30 and current sensor 28 detects motor current MCRT2 flowing through motor generator MG2 and outputs the detected current to control device 30. Control device 30 receives from external ECU 60 torque command value TR2, motor revolution number MRN2 and signal STAT of L level.

Then, based on voltage Vm, motor current MCRT2 and torque command value TR2, control device 30 generates signal PWMI2 according to the aforementioned method and outputs the generated signal PWMI2 to inverter 31. As inverter 31 drives motor generator MG2, control device 30 generates signal PWMC for controlling switching of NPN transistors Q1, Q2 according to the aforementioned method based on DC voltage Vb, voltage Vm, torque command value TR2 and motor revolution number MRN2, and outputs the generated signal to voltage step-up converter 12.

Then, according to signal PWMC, voltage step-up converter 12 steps up DC voltage Vb from battery B and supplies the stepped up DC voltage to capacitor C2. Capacitor C2 smoothes the DC voltage from voltage step-up converter 12 and supplies the smoothed DC voltage through nodes N1, N2 to inverter 31. Then, inverter 31 converts the DC voltage smoothed by capacitor C2 into an AC voltage according to signal PWMI2 from motor generator MG2 so as to drive motor generator MG2. Thus, motor generator MG2 generates torque indicated by torque command value TR2 to drive the drive wheels of the hybrid vehicle. The hybrid vehicle is thus caused to start and run at a low speed.

Receiving signal STAT of H level from external ECU 60 while motor generator MG2 is driven, control device 30 determines target voltage Vdc_com (=Vmax) regardless of motor revolution number MRN1 of motor generator MG1, and drives and controls voltage step-up converter 12 to step up DC voltage Vb to the determined target voltage Vdc_com (=Vmax). Then, control device 30 generates, as the voltage step-up operation by voltage step-up converter 12 is completed, based on torque command value TR1 from external ECU 60, motor current MCRT1 from current sensor 24 and output voltage Vm, signal PWMI1 according to the aforementioned method and outputs the signal to inverter 14. Then, inverter 14 converts output voltage Vm (=Vmax) from voltage step-up converter 12 into an AC voltage according to signal PWMI1 so as to drive motor generator MG1, and motor generator MG1 starts engine ENG.

Thus, in motor drive apparatus 100, when motor generator MG2 drives the hybrid vehicle and engine ENG is started, inverter 14 drives motor generator MG1 after the voltage step-up operation by voltage step-up converter 12 is completed. In this way, excessive electric power can be prevented from being taken from battery B.

Although it is described above that inverters 14, 31 drive respective motor generators MG1, MG2 at respective timings after the voltage step-up operation by voltage step-up converter 12 is completed, the present invention is not limited to such a manner as described above and inverters 14, 31 may drive respective motor generators MG1, MG2 after voltage step-up converter 12 starts the step-up operation.

Further, although it is described above that, when motor generator MG2 is in powering mode, namely motor generator MG2 drives the drive wheels of the hybrid vehicle and an instruction to start engine ENG is given, the voltage step-up operation by voltage step-up converter 12 is started and motor generator MG1 is driven after the voltage step-up operation by voltage step-up converter 12 is completed, the present invention is not limited to such a manner as described above and motor generator MG1 may be driven after the voltage step-up operation by voltage step-up converter 12 is started upon receiving an instruction to start engine ENG.

Further, the motor drive apparatus of the present invention may be the one corresponding to motor drive apparatus 100 from which inverter 14 or inverter 31 is removed. Thus, the motor drive apparatus of the present invention may step up DC voltage Vb from battery B and use the stepped up DC voltage to drive motor generator MG1 or motor generator MG2. In the case where one motor generator is driven, the motor drive apparatus drives this motor generator after the voltage step-up operation by voltage step-up converter 12 is started or the voltage step-up operation by voltage step-up converter 12 is completed.

Furthermore, the present invention may be a motor drive apparatus, which determines a target voltage of voltage step-up converter 12 based on motor revolution number MRN1 or MRN2 of one of motor generators MG1 and MG2 that has a higher drive voltage, driving motor generators MG1, MG2 upon receiving an instruction to start engine ENG, after the voltage step-up operation by voltage step-up converter 12 is started or the voltage step-up operation by voltage step-up converter 12 is completed.

Moreover, voltage step-up converter 12 corresponds to "voltage conversion circuit," inverter 14 corresponds to "first drive circuit" and inverter 31 corresponds to "second drive circuit."

Moreover, inverter input voltage command calculation unit 50 corresponds to "target voltage determination means" determining target voltage Vdc_com of step-up voltage Vm, based on the motor revolution number.

Moreover, feedback voltage command calculation unit 52, duty-ratio conversion unit 54 and determination unit 56 correspond to "voltage conversion control means" receiving the target voltage determined by inverter input voltage command calculation unit 50 (target voltage determination means) to control voltage step-up converter 12 (voltage conversion circuit) so that step-up voltage Vm reaches target voltage Vdc_com.

In addition, although it is described above that converter control means 303 determines, upon receiving signal STAT of H level from external ECU 60, that a target voltage of output voltage Vm is maximum voltage Vmax of motor drive apparatus 100, the target voltage of output voltage Vm of the present invention when signal STAT of H level is received may not be maximum voltage Vmax of motor drive apparatus 100, but any voltage that can drive motor generator MG1 in powering mode even when motor revolution number MRN1 of motor generator MG1 changes to any value.

Second Embodiment

As described above in connection with the first embodiment, in motor drive apparatus 100 in FIG. 1, two motor generators MG1, MG2 each function as an electric generator generating an AC voltage in regenerative mode and function as an electric motor in powering mode for driving engine ENG or the drive wheels, depending on the running state of the vehicle.

Regarding the power balance of motor drive apparatus 100 as a whole, supposing that the power consumed by one motor generator (one of MG1 and MG2) driven in powering mode is represented by Pm, the power generated by the other motor generator driven in regenerative mode is represented by Pg, and the power input/output to/from capacitor C2 is represented by Pc, power balance P can be represented by expression (1):

$$P = Pm + Pg + Lg + Lm + Pc \quad (1)$$

where Lg, Lm represent respective power losses of the motor generators.

As clearly seen from expression (1), as long as power balance P is "0," namely there is a balance between the consumed power and the generated power, it is unnecessary to input/output electric power to/from battery B. In contrast, when power balance P is not "0," namely when the consumed power exceeds the generated power, the power shortage is taken from battery B or, when the generated power exceeds the consumed power, the excessive power is brought into battery B.

Then, in order to prevent excessive electric power from being input/output to/from battery B, it is necessary to adjust power balance P so as not to allow the power input/output to/from battery B to exceed the range of the electric power that can be input/output to/from battery B, namely so as to establish the relation represented by expression (2):

$$Win < Pm + Pg + Lg + Lm + Pc < Wout \quad (2)$$

where Win represents electric power that can be input to battery B (hereinafter also referred to as "battery input") and Wout represents electric power that can be output from battery B (hereinafter also referred to as "battery output").

In other words, as long as power balance P finally satisfies the relation represented by expression (2), it is not particularly necessary to adjust each term of power balance P with respect to the battery output.

However, in the case where motor generator MG1, MG2 are stopped and motor drive apparatus 100 performs only the voltage step-up or step-down operation, power balance P is represented by power Pc only that is input/output to/from capacitor C2. Thus, the relation of expression (2) is changed to the relation represented by expression (3):

$$Win < Pc < Wout \quad (3).$$

As seen from expression (3), in order to avoid the situation where power Pc that is input/output to/from capacitor C2 exceeds battery input Win and battery output Wout, it is necessary to newly control the terminal-to-terminal voltage of capacitor C2, namely the rate of change of output voltage Vm of voltage step-up converter 12 (hereinafter, the rate of change in the voltage step-up operation is also referred to as step-up rate and the rate of change in the voltage step-down operation is also referred to as step-down rate).

Here, it is supposed that the electrostatic capacitance of capacitor C2 is C, the control period of control device 30A is T (T corresponds to a period of time that is necessary for setting output voltage Vm to a target voltage), the terminal-to-terminal voltage of capacitor C2 at time t (t has an arbitrary value) is $V_0$, and a target voltage at time t+T (corresponding to the terminal-to-terminal voltage of capacitor C2 after one control period) is V. Then, power Pc input/output to/from capacitor C2 in expression (3) is represented by expression (4):

$$Win \leq \tfrac{1}{2} \cdot C \cdot (V^2 - V_0^2)/T \leq Wout \quad (4).$$

Thus, target voltage V may be determined so that the relation of expression (4) is satisfied to prevent power Pc input/output to/from capacitor C2 from exceeding battery input Win and battery output Wout.

In other words, for the voltage step-up operation, target voltage V may be determined to satisfy the relation:

$$V \leq (2 \cdot Wout \cdot T/C + V_0^2)^{1/2} \quad (5).$$

For the voltage step-down operation, target voltage V may be determined to satisfy the relation:

$$V \geq (2 \cdot Win \cdot T/C + V_0^2)^{1/2} \quad (6).$$

Since the determined target voltage V gradually increases in each period T to have the final value that is target voltage Vdc_com of voltage step-up converter 12 as described in connection with the first embodiment, the determined target voltage is also referred to as gradual target voltage Vdc_stp in the present embodiment. Correspondingly, target voltage Vdc_com is also referred to as final target voltage Vdc_com.

As discussed above, the motor drive apparatus in the present embodiment is characterized by the fact that the step-up rate and the step-down rate of voltage step-up converter 12 can be varied based on battery input Win and battery output Wout. It is hereinafter described how the step-up rate and the step-down rate are specifically controlled. It is noted that the motor drive apparatus in the present embodiment differs from motor drive apparatus 100 of the first embodiment only in the configuration of converter control means 303 of control device 30 and they are identical in basic configuration, and the detailed description of common components is not repeated.

Figure 10:
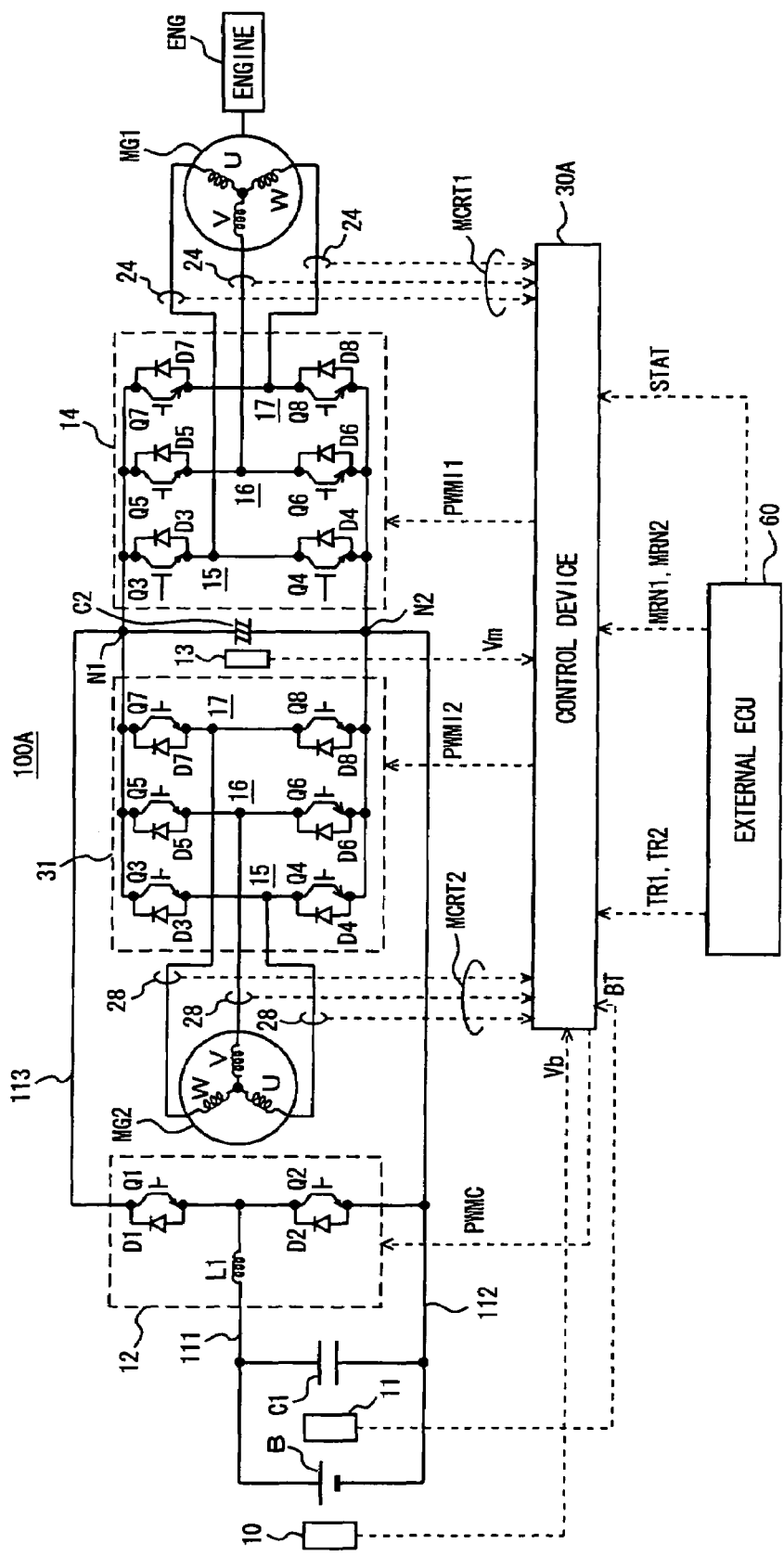
FIG. 10 is a schematic diagram of a motor drive apparatus according to a second embodiment of the present invention.

FIG. 10 is a schematic diagram of the motor drive apparatus according to the second embodiment of the present invention. Referring to FIG. 10, motor drive apparatus 100A includes battery B, capacitors C1, C2, voltage sensors 10, 13, voltage step-up converter 12, inverters 14, 31, current sensors 24, 28, and a temperature sensor 11. As compared with motor drive apparatus 100 shown in FIG. 1, motor drive apparatus 100A in FIG. 10 additionally includes temperature sensor 11 detecting the temperature of battery B, includes a control device 30A instead of control device 30 of motor drive apparatus 100, and is identical to motor drive apparatus 100 in other respects.

Temperature sensor 11 detects the temperature of battery B and outputs the detected battery temperature BT to control device 30A.

Control device 30A receives from external ECU 60 torque command values TR1, TR2, motor revolution numbers MRN1, MRN2 and signal STAT, receives DC voltage Vb from voltage sensor 10, receives output voltage Vm from voltage sensor 13, receives motor current MCRT1 from current sensor 24, receives motor current MCRT2 from current sensor 28, and receives battery temperature BT from temperature sensor 11.

Control device 30A generates, based on output voltage Vm, motor current MCRT1 and torque command value TR1, signal PWMI1 for controlling switching of NPN transistors Q3 to Q8 of inverter 14 when inverter 14 drives motor generator MG1 according to the aforementioned method.

Further, control device 30A generates, based on output voltage Vm, motor current MCRT2 and torque command value TR2, signal PWMI2 for controlling switching of NPN transistors Q3 to Q8 of inverter 31 when inverter 31 drives motor generator MG2 according to the aforementioned method.

Furthermore, when inverter 14 (or 31) drives motor generator MG1 (or motor generator MG2), control device 30A generates, based on DC voltage Vb, output voltage Vm, torque command value TR1 (or TR2), motor revolution number MRN1 (or MRN2) and battery temperature BT, signal PWMC for controlling switching of NPN transistors Q1, Q2 of voltage step-up converter 12 according to a method described hereinlater.

When control device 30A receives signal STAT of L level from external ECU 60 (namely receives an instruction to stop the engine) and then generates signals PWMI1, PWMI2 and PWMC, control device 30A outputs the generated signals PWMI1, PWMI2 and PWMC respectively to inverter 14, inverter 31 and voltage step-up converter 12 without adjusting the output timing.

Further, when control device 30A receives signal STAT of H level from external ECU 60 (namely receives an instruction to start the engine) and then generates signals PWMI1, PWMI2 and PWMC, control device 30A outputs the generated signals PWMI1, PWMI2 and PWMC respectively to inverter 14, inverter 31 and voltage step-up converter 12, with adjustments made to the output timing.

The output timing is adjusted, as described in connection with the first embodiment, by first outputting signal PWMC to voltage step-up converter 12 and controlling voltage step-up converter 12 to step up DC voltage Vb and, after the voltage step-up operation by voltage step-up converter 12 is completed, signals PWMI1, PWMI2 are output respectively to inverters 14, 31.

Figure 11:
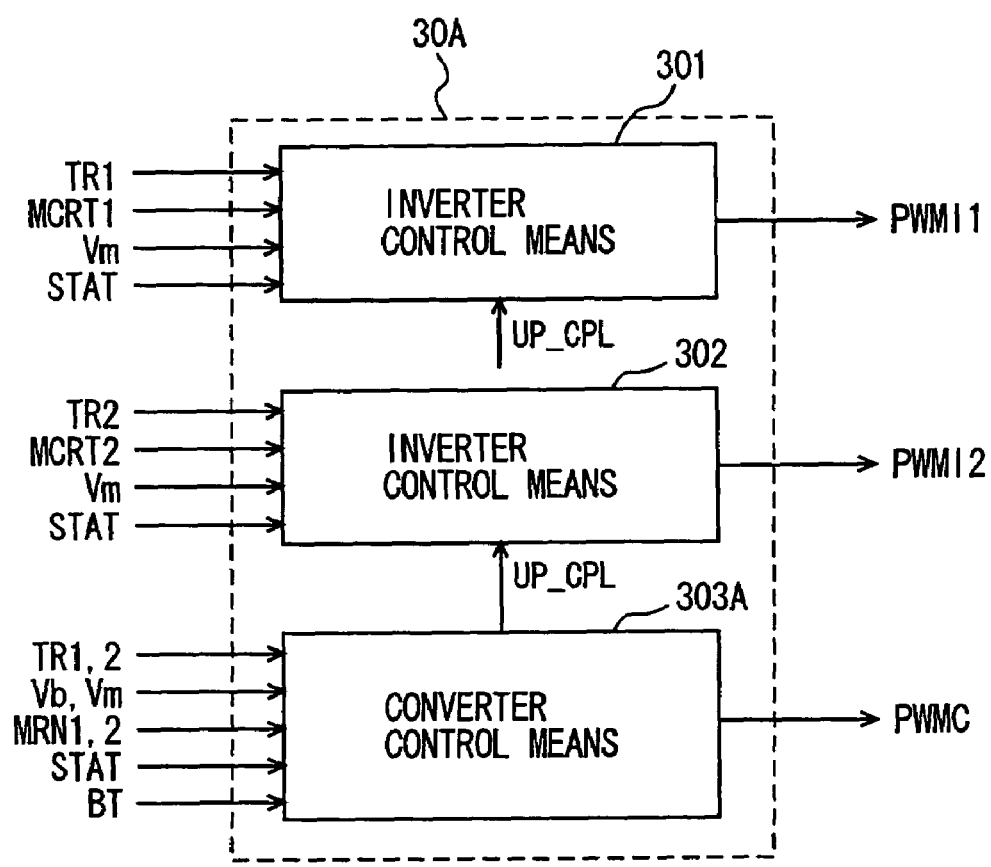
FIG. 11 is a functional block diagram of a control device 30A shown in FIG. 10.

FIG. 11 is a functional block diagram of control device 30A shown in FIG. 10. Referring to FIG. 11, control device 30A includes inverter control means 301, 302 and converter control means 303A. Control device 30A differs from control device 30 in FIG. 2 in that the former includes converter control means 303A instead of converter control means 303.

Inverter control means 301 receives from external ECU 60 torque command value TR1 and signal STAT, receives motor current MCRT1 from current sensor 24, receives voltage Vm from voltage sensor 13, and receives signal UP_CPL from converter control means 303A.

Inverter control means 301 generates, based on torque command value TR1, motor current MCRT1 and voltage Vm, signal PWMI1 according to the aforementioned method. Then, receiving signal STAT of L level from external ECU 60, inverter control means 301 outputs the generated signal PWMI1 to inverter 14 without adjusting the output timing. In contrast, receiving signal STAT of H level from external ECU 60, inverter control means 301 outputs signal PWMI1 to inverter 14, not simultaneously with the generation of signal PWMI1, but after receiving signal UP_CPL from converter control means 303A.

Inverter control means 302 receives from external ECU 60 torque command value TR2 and signal STAT, receives motor current MCRT2 from current sensor 28, receives voltage Vm from voltage sensor 13, and receives signal UP_CPL from converter control means 303A.

Inverter control means 302 generates, based on torque command value TR2, motor current MCRT2 and voltage Vm, signal PWMI2 according to the aforementioned method. Then, receiving signal STAT of L level from external ECU 60, inverter control means 302 outputs the generated signal PWMI2 to inverter 31 without adjusting the output timing. In contrast, receiving signal STAT of H level from external ECU 60, inverter control means 302 outputs signal PWMI2 to inverter 31, not simultaneously with the generation of the signal, but after receiving signal UP_CPL from converter control means 303A.

Converter control means 303A receives from external ECU 60 torque command values TR1, 2, motor revolution numbers MRN1, 2 and signal STAT, receives DC voltage Vb from voltage sensor 10, receives voltage Vm from voltage sensor 13, and receives battery temperature BT from temperature sensor 11.

Receiving signal STAT of L level from external ECU 60, converter control means 303A calculates final target voltage Vdc_com based on the torque command value and the motor revolution number of one of motor generators MG1 and MG2 that is higher in output voltage. Further, based on battery input Win and battery output Wout, converter control means 303A calculates gradual target voltage Vdc_stp so that the relations of expressions (5) and (6) discussed above are satisfied.

Then, converter control means 303A generates signal PWMC for setting output voltage Vm of voltage step-up converter 12 to the calculated gradual target voltage Vdc_stp and outputs the generated signal to voltage step-up converter 12. Signal PWMC is generated until gradual target voltage Vdc_stp reaches final target voltage Vdc_com by feedback control described hereinlater.

In contrast, receiving signal STAT of H level from external ECU 60, converter control means 303A determines that final target voltage Vdc_com is maximum voltage Vmax of motor drive apparatus 100A, regardless of the drive voltages of motor generators MG1, MG2. Further, converter control means 303A calculates gradual target voltage Vdc_stp based on battery input Win and battery output Wout so that the relations of expressions (5) and (6) are satisfied.

Then, based on the calculated gradual target voltage Vdc_stp, DC voltage Vb and output voltage Vm, converter control means 303A generates signal PWMC for stepping up DC voltage Vb to output voltage Vm so that output voltage Vm is equal to gradual target voltage Vdc_stp, and outputs the generated signal to voltage step-up converter 12. Converter control means 303A then generates, when gradual target voltage Vdc_stp reaches final target voltage Vdc_com, namely when the voltage step-up operation by voltage step-up converter 12 is completed, signal UP_CPL indicative of completion of the voltage step-up operation, and outputs the generated signal to inverter control means 301, 302.

Figure 12:
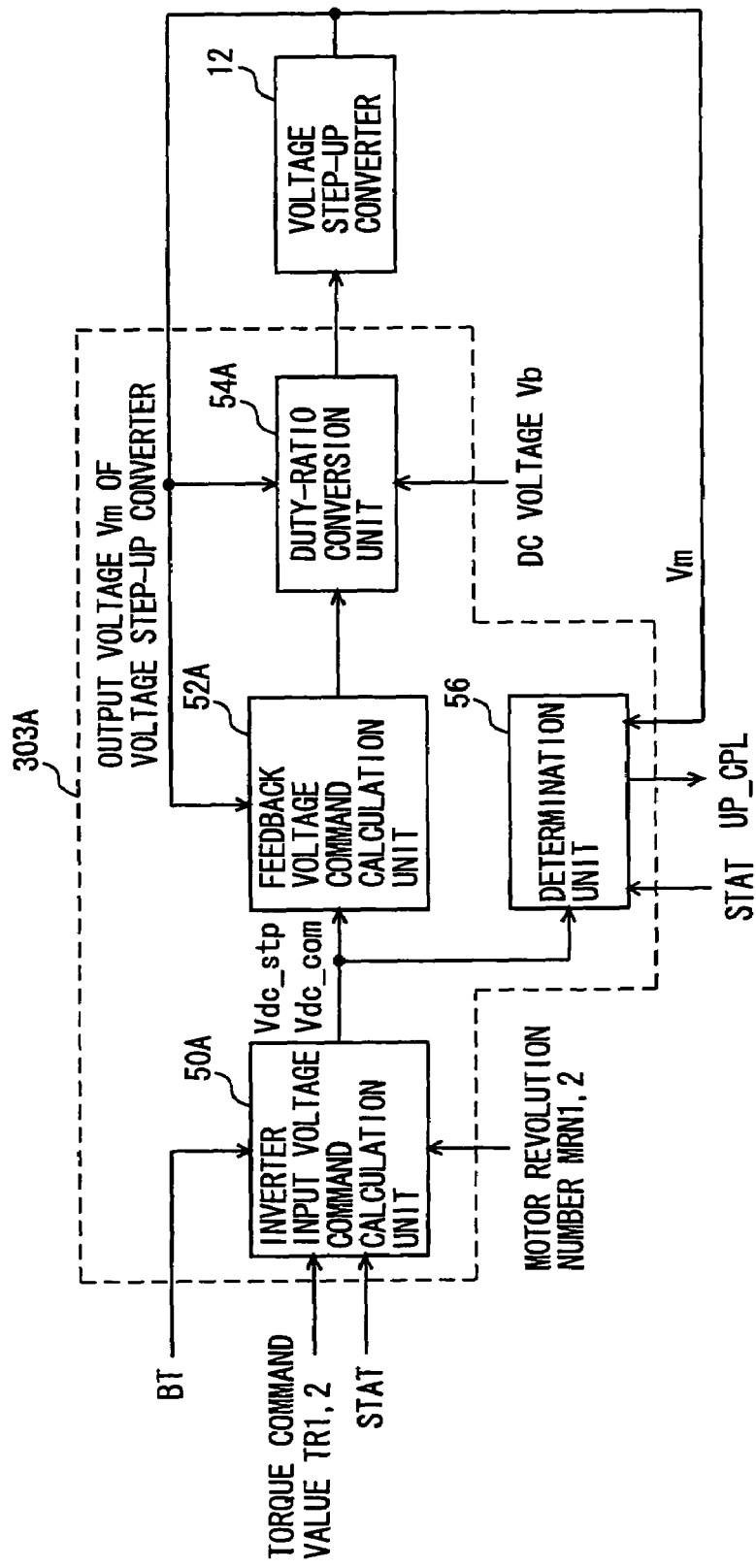
FIG. 12 is a functional block diagram showing converter control means shown in FIG. 11.

FIG. 12 is a functional block diagram of converter control means 303A shown in FIG. 11. Referring to FIG. 12, converter control means 303A includes an inverter input voltage command calculation unit 50A, a feedback voltage command calculation unit 52A, a duty-ratio conversion unit 54A, and determination unit 56. Converter control means 303A differs from converter control means 303 in the first embodiment (see FIG. 4) in that the former includes inverter input voltage command calculation unit 50A, feedback voltage command calculation unit 52A and duty-ratio conversion unit 54A instead of inverter input voltage command calculation unit 50, feedback voltage command calculation unit 52 and duty-ratio conversion unit 54.

Inverter input voltage command calculation unit 50A receives from external ECU 60 torque command values TR1, TR2, motor revolution numbers MRN1, MRN2 and signal STAT, and receives battery temperature BT from temperature sensor 11.

Receiving signal STAT of H level from external ECU 60, inverter input voltage command calculation unit 50A determines that voltage command Vdc_com (corresponding to the final target voltage of output voltage Vm, which is applied as well to the description below) is maximum voltage Vmax of motor drive apparatus 100, regardless of torque command values TR1, TR2 and motor revolution numbers MRN1, MRN2, and outputs the determined voltage command Vdc_com to feedback voltage command calculation unit 52A and determination unit 56. Inverter input voltage command calculation unit 50A holds maximum voltage Vmax.

In contrast, receiving signal STAT of L level from external ECU 60A, inverter input voltage command calculation unit 50A calculates a final target voltage (voltage command Vdc_com) based on the torque command value and the motor revolution number of one of motor generators MG1 and MG2 that has a larger drive voltage. Then, inverter input voltage command calculation unit 50A outputs the calculated voltage command Vdc_com to feedback voltage command calculation unit 52A and determination unit 56.

Further, in addition to the determination and output of such voltage command Vdc_com, inverter input voltage command calculation unit 50A calculates second voltage command Vdc_stp corresponding to the aforementioned gradual target voltage, based on battery input Win and battery output Wout derived from battery temperature BT.

Figure 13:
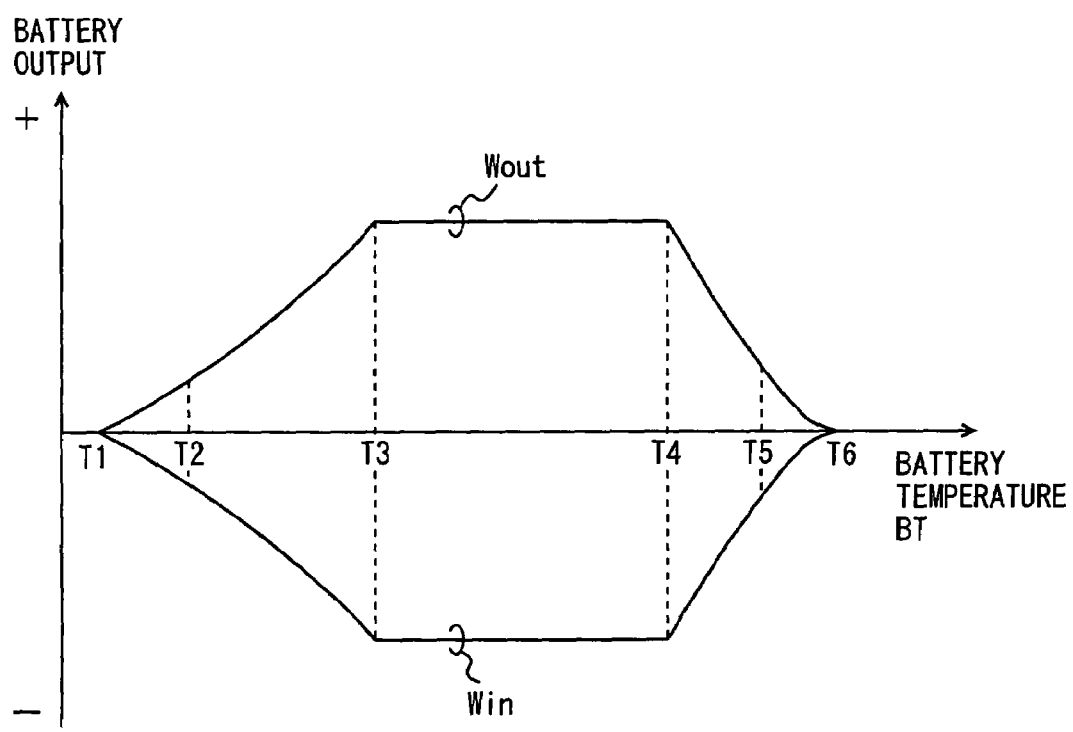
FIG. 13 shows a relation between the battery output and battery temperature of a battery B.

Here, it is known that battery input Win and battery output Wout generally have the relation shown in FIG. 13 with respect to changes in battery temperature BT. FIG. 13 shows the relation between battery input Win and battery output Wout of battery B and battery temperature BT.

Referring to FIG. 13, in the region where battery temperature BT is between T3 and T4, battery output Wout is kept at a substantially constant power level regardless of battery temperature BT. In the region where battery temperature BT is lower than T3, there is found the tendency that battery output Wout decreases as battery temperature BT decreases. In the region where battery temperature BT is higher than T4 as well, there is found the tendency that battery output Wout decreases as battery temperature Bt increases.

Such a relation between battery output Wout and battery temperature BT is applied as well to the relation of battery input Win shown in FIG. 13. In FIG. 13, battery input Win is represented by negative values since the electric power output from battery B is represented by positive values.

Specifically, the magnitude of battery input Win is kept at a substantially constant level in the region where battery temperature BT is between T3 and T4, while the magnitude of battery input Win tends to decrease according to the decrease and increase respectively in the region where battery temperature BT is lower than T3 and the region where battery temperature BT is higher than T4.

Referring again to FIG. 12, inverter input voltage command calculation unit 50A holds in advance the relation between battery input Win and battery output Wout and battery temperature BT shown in FIG. 13. In response to reception of signal STAT, calculation unit 50A reads battery input Win and battery output Wout correlated with battery temperature BT that is input, and uses expressions (5) and (6) to calculate gradual target voltage Vdc_stp. Then, inverter input voltage calculation unit 50A outputs the calculated gradual target voltage Vdc_stp together with final target voltage Vdc_com to feedback voltage command calculation unit 52A. In this way, the voltage step-up (or step-down) operation is performed at a step-up (or step-down) rate according to battery input Win and battery output Wout of battery B to prevent input/output of excessive electric power to/from battery B regardless of the magnitude of the battery output.

Feedback voltage command calculation unit 52A receives output voltage Vm of voltage step-up converter 12 from voltage sensor 13, and receives voltage commands Vdc_com, Vdc_stp from inverter input voltage command calculation unit 50A. Feedback voltage command calculation unit 52A calculates, based on output voltage Vm and voltage command Vdc_stp, feedback voltage command Vdc_stp_fb for setting output voltage Vm to voltage command Vdc_stp, and outputs the calculated feedback voltage command Vdc_stp_fb to duty-ratio conversion unit 54A.

Duty-ratio conversion unit 54A receives DC voltage Vb from voltage sensor 10 and receives output voltage Vm from voltage sensor 13. Duty-ratio conversion unit 54A calculates, based on DC voltage Vb, output voltage Vm and feedback voltage command Vdc_stp_fb, duty ratio DR for setting output voltage Vm to feedback voltage command Vdc_stp_fb, and generates, based on the calculated duty ratio DR, signal PWMC for turning on/off NPN transistors Q1, Q2 of voltage step-up converter 12. Then, duty-ratio conversion unit 54A outputs the generated signal PWMC to NPN transistors Q1, Q2 of voltage step-up converter 12.

Accordingly, voltage step-up converter 12 converts DC voltage Vb into output voltage Vm so that output voltage Vm is equal to gradual target voltage (voltage command Vdc_stp). Duty-ratio conversion unit 54A and feedback command calculation unit 52A perform such a series of control operations while gradually increasing or decreasing voltage command Vdc_stp based on expression (5) or expression (6) in each control period T, and repeatedly perform the control operations until output voltage Vm reaches final target voltage Vdc_com.

Determination unit 56 receives voltage command Vdc_com from inverter input voltage command calculation unit 50A, receives signal STAT from external ECU 60A and receives voltage Vm from voltage sensor 13. Receiving signal STAT of L level from external ECU 60A, determination unit 56 stops operating. Further, receiving signal STAT of H level from external ECU 60, determination unit 56 determines whether or not voltage Vm from voltage sensor 13 reaches voltage command Vdc_com (final target voltage=voltage Vmax) from inverter input voltage command calculation unit 50A. When determination unit 56 determines that voltage Vm reaches voltage command Vdc_com (=Vmax), determination unit 56 generates signal UP_CPL and outputs the signal to inverter control means 301, 302.

As described in connection with the first embodiment, receiving signal STAT of L level from external ECU 60, inverter control means 301, 302 output the generated signals PWMI1, PWMI2 to inverters 14, 31 respectively without adjusting the output timing. Receiving signal STAT of H level from external ECU 60, inverter control means 301, 302 output the generated signals PWMI1, PWMI2 respectively to inverters 14, 31 after the voltage step-up operation by voltage step-up converter 12 is completed.

In other words, receiving signal STAT of L level from external ECU 60, control device 30A drives and controls voltage step-up converter 12 and inverters 14, 31 without adjusting the operation timing. Receiving signal STAT of H level from external ECU 60, control device 30A drives and controls voltage step-up converter 12 to step up the voltage and drives and controls inverters 14, 31 after the voltage step-up operation by voltage step-up converter 12 is completed.

Regarding the entire operation of motor drive apparatus 100A, the operation is similar to the entire operation of motor drive apparatus 100 in FIG. 1 except for the means for determining the step-up and step-down rates described above, and the detailed description is not repeated.

As heretofore described, the motor drive apparatus of the second embodiment of the present invention performs the voltage step-up operation or voltage step-down operation at a step-up or step-down rate appropriate for the battery input and the battery output. Therefore, even when the battery input and the battery output are small, excessive electric power can be prevented from being input/output to/from the battery.

Third Embodiment

According to the above-described first and second embodiments, when engine ENG is started, the timing at which the power required for voltage step-up by voltage step-up converter 12 is the maximum and the timing at which the power required for driving motor generator MG1 is the maximum are set at different timings and thus excessive electric power can be prevented from being taken from battery B.

Here, battery B has its battery output that considerably decreases when battery temperature BT is relatively low or relatively high as described in connection with the second embodiment. For example, as seen from FIG. 13, in the low-temperature region where battery temperature BT is lower than T2 and the high-temperature region where battery temperature BT is higher than T5, respective magnitudes of battery input Win and battery output Wout considerably decrease with respect to a predetermined electric power level in the region between T3 and T4. Thus, when battery temperature BT is low or high, the electric power that can be input/output to/from battery B is considerably restricted.

In order to avoid input/output of excessive electric power to/from battery B even in the case where battery input Win and battery output Wout are small, it is desirable to completely separate from each other the timing at which the power required for voltage step-up by voltage step-up converter 12 is the maximum and the timing at which the power required for driving motor generator MG1 is the maximum. In other words, the power required for driving motor generator MG1 in powering mode is dispersed with respect to time and accordingly the consumed power can be prevented from exceeding the limited battery output Wout.

Further, when engine ENG is stopped, motor drive apparatuses 100, 100A drive motor generator MG1 in regenerative mode as engine revolution number MRNE decreases. The power then generated by motor generator MG1 is brought through capacitor C2 into battery B. In addition, when voltage step-up converter 12 performs the step-down operation for stepping down output voltage Vm as motor revolution number MRN1 of motor generator MG1 decreases, the power that is output from capacitor C2 through the voltage step-down operation is brought into battery B.

Thus, when engine ENG is stopped, both of motor generator MG1 and voltage step-up converter 12 provide power into battery B. At this time, if battery temperature BT is low or high and battery input Win is small, excessive electric power is undesirably brought into battery B.

Therefore, when engine ENG is stopped, it is also required to completely separate from each other the timing at which the power generated by motor generator MG1 is the maximum and the timing at which the power that is input from voltage step-up converter 12 is the maximum. In other words, the power generated when motor generator MG1 is driven in regenerative mode is dispersed with respect to time and thus charging power can be prevented from exceeding the restricted battery input Win.

Accordingly, a motor drive apparatus of the present embodiment is configured to additionally includes, as compared with motor drive apparatus 100A of the second embodiment, means for dispersing consumption power when motor generator MG1 is driven in powering mode, and means for dispersing charging power when motor generator MG1 is driven in regenerative mode.

Specifically, the motor drive apparatus of the present embodiment is basically configured as motor drive apparatus 100A shown in FIG. 10 and is further characterized by that the output timing of signals PWMI1, PWMI2, PWMC that are output to inverters 14, 31 and voltage step-up converter 12 is adjusted depending on battery temperature BT.

The output timing of these signals is adjusted in the following manner. When battery temperature BT is in the normal region (corresponding to the region in FIG. 13 where battery temperature BT is between T2 and T5, which is applied as well to the description below), motor generator MG1 is started to be driven at a timing different from the timing at which the voltage step-up converter 12 starts to step up the voltage, as the second embodiment.

In contrast, when battery temperature BT is in the low-temperature region (where battery temperature BT is lower than T2) or high-temperature region (where battery temperature BT is higher than T5), the output timing of each signal is adjusted to prevent overlapping of the period in which motor generators MG1, MG2 are driven and the period in which voltage step-up converter 12 is operated. Specifically, (1) when engine ENG is started, after the voltage step-up operation by voltage step-up converter 12 is completed, motor generator MG1 receives torque command value TR1 to start to be driven in powering mode and thereby start cranking operation of engine ENG. (2) When engine ENG is stopped, motor generator MG1 is driven in regenerative mode and, after a process of stopping engine ENG is completed, voltage step-up converter 12 starts to step down the voltage. Using this configuration, it is ensured that excessive electric power is prevented from being input/output to/from battery B even for the restricted battery input Win and battery output Wout.

A method of adjusting the output timing of signals PWMI1, PWMI2, PWMC of the present embodiment is specifically described. Here, the adjustment of the output timing when battery temperature BT is in the normal region is made following the procedure described above in connection with the second embodiment. Therefore, the detailed description of this adjustment is not repeated. In the following, the description is mainly given concerning the method of adjusting the output timing of each signal when battery temperature BT is in the low-temperature region or high-temperature region. Further, the method of adjusting the output timing is described for each of the case where (1) engine ENG is started and the case where (2) engine ENG is stopped as discussed above.

(1) Adjustment of Output Timing when Engine is Started

Figure 14:
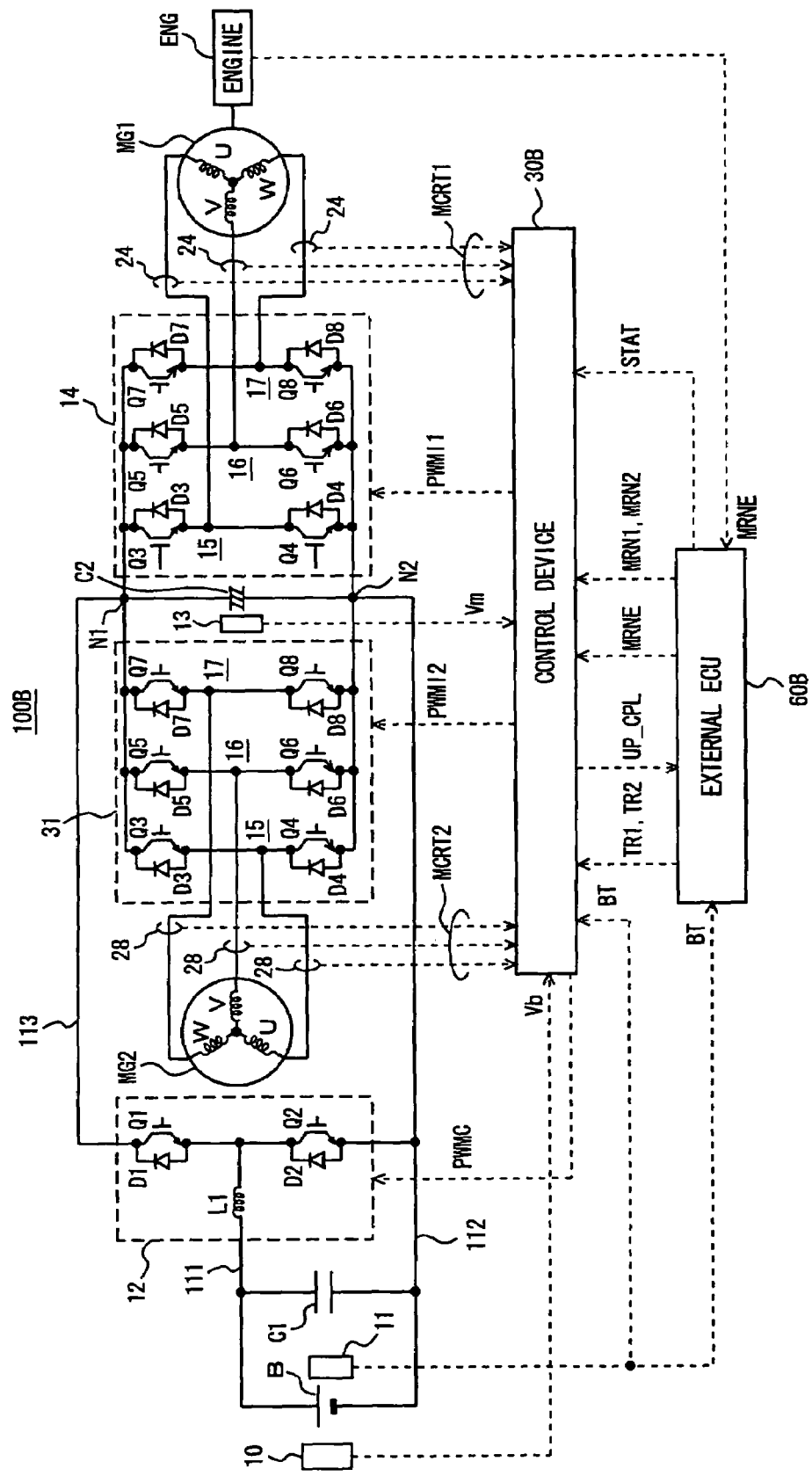
FIG. 14 is a schematic diagram of a motor drive apparatus according to a third embodiment of the present invention.

A configuration of the motor drive apparatus for adjusting the output timing in the present embodiment is first shown. FIG. 14 is a schematic diagram of the motor drive apparatus according to the third embodiment of the present invention.

Referring to FIG. 14, motor drive apparatus 100B in the third embodiment of the present invention includes battery B, capacitors C1, C2, voltage sensors 10, 13, temperature sensor 11, voltage step-up converter 12, inverters 14, 31, current sensors 24, 28, and a control device 30B. Motor drive apparatus 100B includes an external ECU 60B and control device 30B instead of external ECU 60 and control device 30A of motor drive apparatus 100A shown in FIG. 10 and other details are identical to those of motor drive apparatus 100A.

External ECU 60B receives battery temperature BT from temperature sensor 11, receives engine revolution number MRNE from engine ENG, and receives from control device 30B signal UP_CPL indicating that the voltage step-up operation is completed. External ECU 60B outputs, to control device 30B, signal STAT for instructing to start/stop engine ENG, torque command values TR1, TR2, motor revolution numbers MRN1, MRN2, and engine revolution number MRNE.

Control device 30B receives from external ECU 60B torque command values TR1, TR2, motor revolution numbers MRN1, MRN2, signal STAT and engine revolution number MRNE, receives DC voltage Vb from voltage sensor 10, receives output voltage Vm from voltage sensor 13, receives motor current MCRT1 from current sensor 24, receives motor current MCRT2 from current sensor 28, and receives battery current BT from temperature sensor 11.

Control device 30B generates, based on output voltage Vm, motor current MCRT1 and torque command value TR1, signal PWMI1 for controlling switching of NPN transistors Q3 to Q8 of inverter 14 when inverter 14 drives motor generator MG1.

Further, control device 30B generates, based on output voltage Vm, motor current MCRT2 and torque command value TR2, signal PWMI2 for controlling switching of NPN transistors Q3 to Q8 of inverter 31 when inverter 31 drives motor generator MG2.

Furthermore, control device 30B generates, when inverter 14 (or 31) drives motor generator MG1 (or motor generator MG2), based on DC voltage Vb, output voltage Vm, torque command value TR1 (or TR2), motor revolution number MRN1 (or MRN2), engine revolution number MRNE, and battery temperature BT, signal PWMC for controlling NPN transistors Q1, Q2 of voltage step-up converter 12 according to a method described below.

With the above described configuration, the output timing of signals PWMI1, PWMI2, PWMC is adjusted, when battery temperature BT is in the low or high-temperature region, by controlling the timing of signals communicated between external ECU 60B and control device 30B.

Specifically, when engine ENG is started, in response to a change of signal STAT from L level to H level, external ECU 60B outputs, to control device 30B, torque command values TR1, TR2 at the timing adjusted according to battery temperature BT. More specifically, when battery temperature BT is in the low or high-temperature region, external ECU 60B outputs torque command values TR1, TR2 to control device 30B at the timing which is after external ECU 60B outputs signal STAT of H level to control device 30B and at which external ECU 60B receives signal UP_CPL from control device 30B. Namely, external ECU 60B waits until completion of the voltage step-up operation by voltage step-up converter 12 is detected and then outputs torque command values TR1, TR2 to control device 30B.

When battery temperature BT is in the normal region, external ECU 60B does not make such an adjustment and outputs torque command values TR1, TR2 to control device 30B at the timing which is the same as the timing at which external ECU 60B outputs signal STAT of H level.

Thus, when battery temperature BT is in the low or high-temperature region, control device 30B drives and controls voltage step-up converter 12 according to signal STAT of H level, starts to drive and control inverters 14, 31 according to torque command values TR1, TR2 that are input from external ECU 60B after the voltage step-up operation is completed, and starts cranking operation of engine ENG.

In contrast, when battery temperature BT is in the normal region, voltage step-up converter 12 is driven and controlled according to signal STAT of H level, and inverters 14, 31 are driven and controlled so that torque designated by torque command values TR1, TR2 is output that reach predetermined values when the voltage step-up operation is completed, as done in the second embodiment.

Figure 15:
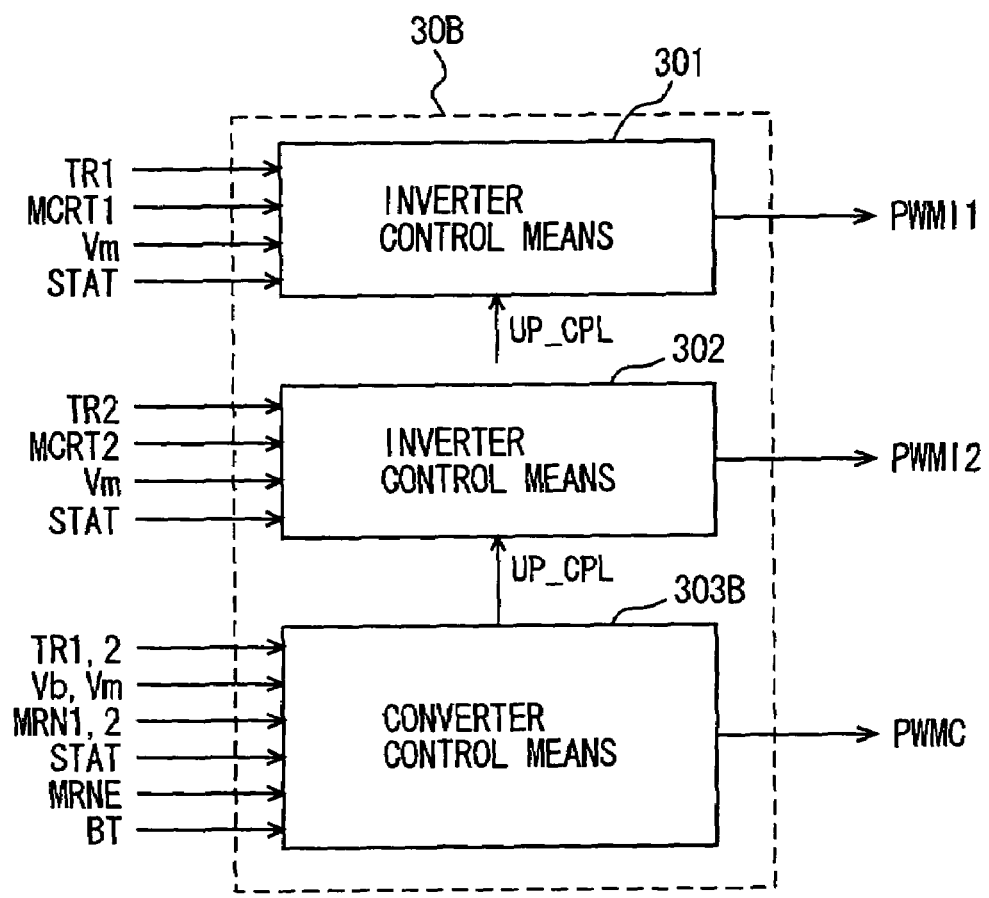
FIG. 15 is a functional block diagram of a control device shown in FIG. 14.

FIG. 15 is a functional block diagram of control device 30B shown in FIG. 14.

Referring to FIG. 15, control device 30B includes inverter control means 301, 302 and converter control means 303B. Control device 30B differs from control device 30A shown in FIG. 11 in that the former includes converter control means 303B instead of converter control means 303A and other details are identical to those of control device 30A.

Inverter control means 301 receives torque command value TR1 and signal STAT from external ECU 60B, receives motor current MCRT1 from current sensor 24, receives voltage Vm from voltage sensor 13, and receives signal UP_CPL from converter control means 303B.

When signal STAT has H level and battery temperature BT is in the low or high-temperature region, inverter control means 301, under control by external ECU 60B, receives signal UP_CPL and thereafter receives torque command value TR1. In contrast, when battery temperature BT is in the normal region, inverter control means 301 receives torque command value TR1 and signal STAT at the same timing.

Then, based on torque command value TR1, motor current MCRT1 and voltage Vm, inverter control means 301 generates signal PWMI1 according to the aforementioned method. When battery temperature BT is in the low or high-temperature region, inverter control means 301 receives torque command value TR1 together with signal UP_CPL and thus starts to generate signal PWMI1 at the timing at which the voltage step-up operation is completed.

Thus, when battery temperature BT is in the low or high-temperature region, inverter control means 301 generates signal PWMI1 after receiving signal UP_CPL from converter control means 303B and then outputs the generated signal to inverter 14.

Inverter control means receives torque command value TR2 and signal STAT from external ECU 60B, receives motor current MCRT2 from current sensor 28, receives voltage Vm from voltage sensor 13, and receives signal UP_CPL from converter control means 303B. As inverter control means 301, inverter control means 302 receives, when engine ENG is started and battery temperature BT is in the low or high-temperature region, signal UP_CPL and thereafter receives torque command value TR2. In contrast, when battery temperature BT is in the normal region, inverter control means 302 receives signal STAT of H level and torque command value TR2 at the same timing.

Inverter control means 302 generates signal PWMI2 based on torque command value TR2, motor revolution number MCRT2 and voltage Vm, according to the method as described above. When battery temperature BT is in the low or high-temperature region, inverter control means 302 generates signal PWMI2 after receiving signal UP_CPL from converter control means 303B and outputs the generated signal to inverter 31.

Converter control means 303B receives from external ECU 60B torque command values TR1, 2, motor revolution numbers MRN1, 2, engine revolution umber MRNE, and signal STAT, receives DC voltage Vb from voltage sensor 10, receives voltage Vm from voltage sensor 13, and receives battery temperature BT from temperature sensor 11.

Receiving signal STAT of H level from external ECU 60B, converter control means 303B determines that final target voltage Vdc_com is maximum voltage Vmax of motor drive apparatus 1003B, regardless of the drive voltage of motor generators MG1, MG2. Further, converter control means 303B calculates gradual target voltage Vdc_stp based on battery input Win and battery output Wout so that the relation of expression (5) described in connection with the second embodiment is satisfied. Battery input Win and battery output Wout are determined based on the detected battery temperature BT as described above.

Based on the calculated gradual target voltage Vdc_stp, DC voltage Vb and output voltage Vm, converter control means 303B generates signal PWMC for stepping up DC voltage Vb to output voltage Vm so that output voltage Vm is equal to gradual target voltage Vdc_stp, and outputs the generated signal to voltage step-up converter 12. When gradual target voltage Vdc_stp reaches final target voltage Vdc_com, namely the voltage step-up operation by voltage step-up converter 12 is completed, converter control means 303B generates signal UP_CPL indicative of completion of the voltage step-up operation, and outputs the signal to inverter control means 301, 302 and external ECU 60B. Signal PWMC is generated under feedback control until gradual target voltage Vdc_stp reaches final target voltage Vdc_com.

Figure 16:
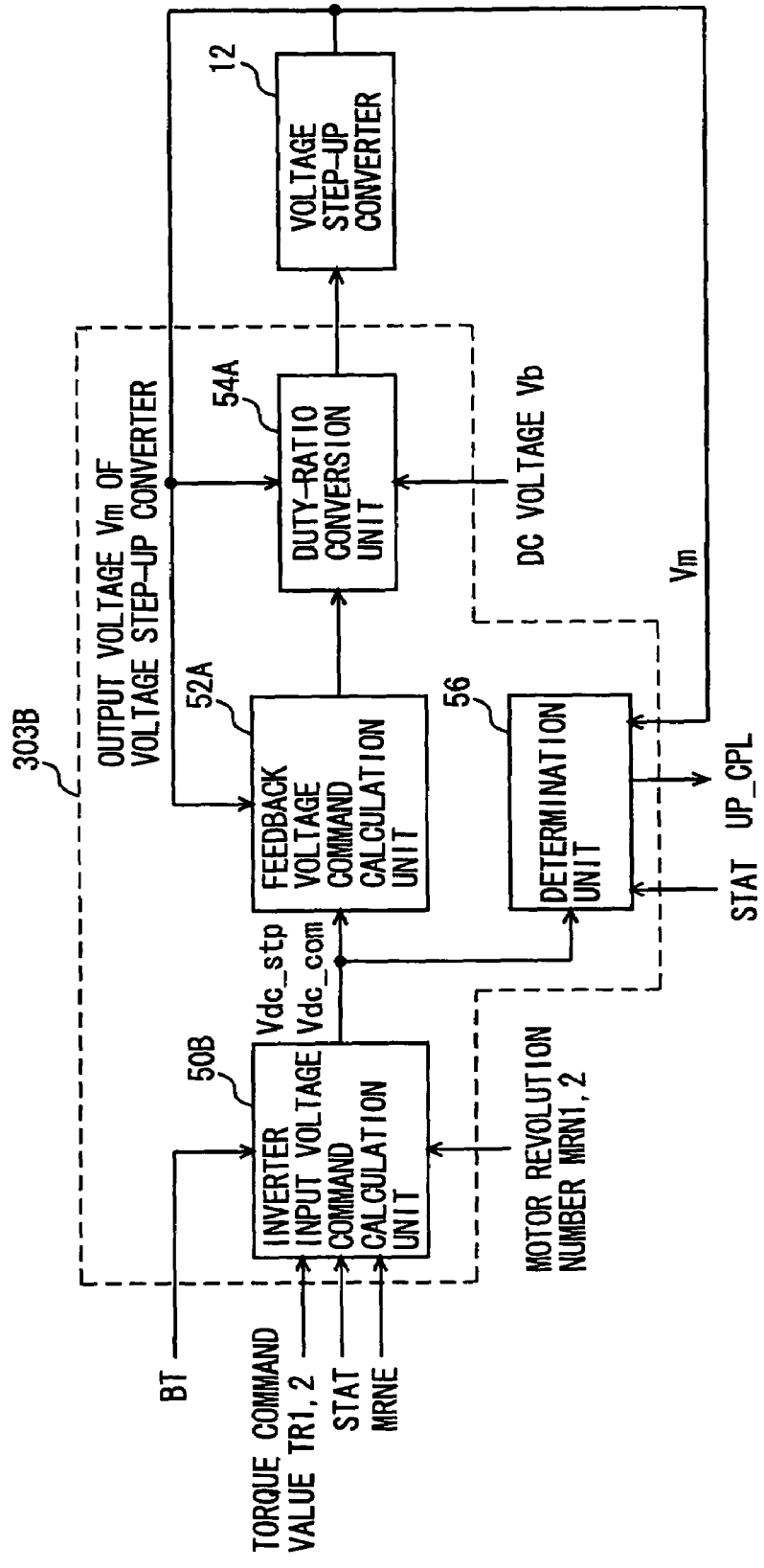
FIG. 16 is a functional block diagram of converter control means shown in FIG. 15.

FIG. 16 is a functional block diagram of converter control means 303B shown in FIG. 15.

Referring to FIG. 16, converter control means 303B includes an inverter input voltage command calculation unit 50B, feedback voltage command calculation unit 52A, duty-ratio conversion unit 54A, and determination unit 56. Converter control means 303B differs from converter control means 303A in the second embodiment (see FIG. 12) in that the former includes inverter input voltage command calculation unit 50B instead of inverter input voltage command calculation unit 50A, and other details are identical to those of converter control means 303A.

Inverter input voltage command calculation unit 50B receives from external ECU 60B torque command values TR1, TR2, motor revolution numbers MRN1, MRN2, signal STAT and engine revolution number MRNE, and receives battery temperature BT from temperature sensor 11.

Receiving signal STAT of H level from external ECU 60B, inverter input voltage command calculation unit 50B determines that voltage command Vdc_com (corresponding to a final target voltage of output voltage Vm) is maximum voltage Vmax of motor drive apparatus 100B, regardless of torque command values TR1, TR2 and motor revolution numbers MRN1, MRN2, and outputs the determined voltage command Vdc_com to feedback voltage command calculation unit 52A and determination unit 56. Here, inverter input voltage command calculation unit 50B holds maximum voltage Vmax.

Further, based on battery input Win and battery output Wout derived from battery temperature BT, inverter input voltage command calculation unit 50B calculates second voltage command Vdc_stp corresponding to the aforementioned gradual target voltage. Then, inverter input voltage calculation unit 50B outputs the calculated second voltage command Vdc_stp together with voltage command Vdc_com to feedback voltage command calculation unit 52A.

Feedback voltage command calculation unit 52A receives output voltage Vm of voltage step-up converter 12 from voltage sensor 13, and receives voltage commands Vdc_com, Vdc_stp from inverter input voltage command calculation unit 50B. Based on output voltage Vm and voltage command Vdc_stp, feedback voltage command calculation unit 52A calculates feedback voltage command Vdc_stp_fb for setting output voltage Vm to voltage command Vdc_stp, and outputs the calculated feedback voltage command Vdc_stp_fb to duty-ratio conversion unit 54A.

Duty-ratio conversion unit 54A receives DC voltage Vb from voltage sensor 10 and receives output voltage Vm from voltage sensor 13. Based on DC voltage Vb, output voltage Vm and feedback voltage command Vdc_stp_fb, duty-ratio conversion unit 54A calculates duty ratio DR for setting output voltage Vm to feedback voltage command Vdc_stp_fb, and generates, based on the calculated duty ratio DR, signal PWMC for turning on/off NPN transistors Q1, Q2 of voltage step-up converter 12. Then, duty-ratio conversion unit 54A outputs the generated signal PWMC to NPN transistors Q1, Q2 of voltage step-up converter 12.

Accordingly, voltage step-up converter 12 converts DC voltage Vb into output voltage Vm so that output voltage Vm is equal to gradual target voltage (voltage command Vdc_stp). Duty-ratio conversion unit 54A and feedback command calculation unit 52A gradually increase or gradually decrease voltage command Vdc_stp based on expression (5) described above for each control period T, while repeatedly perform the above-described series of control operations until output voltage Vm reaches final target voltage Vdc_com.

Determination unit 56 receives voltage command Vdc_com from inverter input voltage command calculation unit 50B, receives signal STAT from external ECU 60B and receives voltage Vm from voltage sensor 13. Receiving signal STAT of L level from external ECU 60B, determination unit 56 stops operating. Further, receiving signal STAT of H level from external ECU 60B, determination unit 56 determines whether or not voltage Vm from voltage sensor 13 reaches voltage command Vdc_com (final target voltage=voltage Vmax) received from inverter input voltage command calculation unit 50B. Determining that voltage Vm reaches voltage command Vdc_com (=Vmax), determination unit 56 generates signal UP_CPL and outputs the signal to inverter control means 301, 302 and external ECU 60B.

As described above, when an instruction to start engine ENG is given, in the case where battery temperature BT is in the low or high-temperature region, control device 30B drives and controls voltage step-up converter 12 according to signal STAT of H level from external ECU 60B and starts the voltage step-up operation. Then, according to torque command values TR1, TR2 that are input after the voltage step-up operation is completed, control device 30B generates signals PWMI1, PWMI2 and drives and controls inverters 14, 31 according to signals PWMI1, PWMI2 to start the cranking operation.

FIG. 17 is a timing chart of signals and voltage when motor generator MG1 coupled to engine ENG shown in FIG. 14 is driven in powering mode. FIG. 17 is a timing chart applied to the case where battery temperature BT is in the low or high-temperature region. Since the operation follows the timing chart shown in FIG. 5 in the first embodiment in the case where battery temperature BT is in the normal region, the detailed description is not repeated.

Referring to FIG. 17, in the case where the third embodiment of the present invention is applied, when signal STAT changes from L level to H level at timing t1, namely an instruction to start engine ENG is given, converter control means 303B generates signal PWMC according to the aforementioned method and outputs the generated signal to voltage step-up converter 12, and drives and controls voltage step-up converter 12 so that DC voltage Vb is stepped up to maximum voltage Vmax of motor drive apparatus 100 regardless of the drive voltage of motor generators MG1, MG2. Here, the step-up rate of voltage step-up converter 12 is determined, as described above, based on battery output Wout correlated with detected battery temperature BT.

Then, voltage step-up converter 12 starts the voltage step-up operation of stepping up DC voltage Vb to maximum voltage Vmax according to signal PWMC, and output voltage Vm of voltage step-up converter 12 gradually increases after timing t1 and reaches maximum voltage Vmax around timing t2. Converter control means 303B generates, when output voltage Vm reaches maximum voltage Vmax, signal UP_CPL indicating that the voltage step-up operation by voltage step-up converter 12 is completed, and outputs the generated signal to inverter control means 301 and external ECU 60B.

Receiving signal UP_CPL at timing t2, external ECU 60B outputs torque command value TR1 to inverter control means 301 of control device 30B.

After timing t2, namely after the voltage step-up operation is completed, torque command value TR1 increases to attain a predetermined value around timing t3.

Receiving signal UP_CPL from converter control means 303B and torque command value TR1 from external ECU 60B, inverter control means 301 generates signal PWMI1, after timing t2, based on torque command value TR1, motor current MCRT1 and output voltage Vm (=Vmax), and outputs the generated signal PWMI1 to inverter 14. Inverter 14 converts maximum voltage Vmax resultant from the step up by voltage step-up converter 12 into an AC voltage according to signal PWMI1 to drive motor generator MG1 in powering mode.

Motor generator MG1 is thus driven by inverter 14 and motor revolution number MRN1 sharply increases after timing t3. Motor generator MG1 accordingly outputs the torque designated by torque command value TR1 and starts engine ENG.

Thus, in the third embodiment of the present invention, in the case where battery temperature BT is in the low or high-temperature region, when an instruction to start engine ENG is issued, firstly voltage step-up converter 12 is driven and controlled and torque command value TR1 is output after the voltage step-up operation by voltage step-up converter 12 is completed, and then inverter 14 is started to be driven and controlled to start cranking operation of engine ENG.

The power required for stepping up DC voltage Vb reaches the maximum in region RGE1 between timing t1 and timing t2, and the power required for driving motor generator MG1 reaches the maximum in region RGE2 that is after timing t3 and completely separated from region RGE1. Accordingly, region RGE1 where the power required for stepping up DC voltage Vb reaches the maximum and region RGE2 where the power required for driving motor generator MG1 reaches the maximum can completely be separated from each other. Thus, even when the temperature is low or high where battery output Vout is small, excessive electric power can be prevented from being taken from battery B to voltage step-up converter 12 and inverters 14, 31.

(2) Adjustment of Output Timing when Engine is Stopped

A description is now given of the adjustment of output timing of signals PWMI1, PWMI2, PWMC that is made when an instruction to stop engine ENG is issued. As described above, in the case where battery temperature BT is in the low or high-temperature region, control device 30B drives motor generator MG1 in regenerative mode according to signal STAT of L level, and drives and controls voltage step-up converter 12 so that the voltage step-down operation is started after the operation of stopping the motor is completed. Such control is performed mainly by converter control means 303B of control device 30B.

In particular, referring again to FIG. 15, receiving signal STAT of L level from external ECU 60B, converter control means 303B calculates final target voltage Vdc_com based on the torque command value and motor revolution number of one of the motor generators (one of motor generators MG1 and MG2) that is higher in drive voltage. Further, converter control means 303B calculates gradual target voltage Vdc_stp based on battery input Win and battery output Wout so that the relation of expression (6) described above is satisfied.

Then, converter control means 303B generates signal PWMC for setting output voltage Vm of voltage step-up converter 12 to the calculated gradual target voltage Vdc_stp and outputs the generated signal to voltage step-up converter 12.

Here, in the case where signal STAT has L level, converter control means 303B varies the timing at which signal PWMC is output, depending on battery temperature BT.

In particular, in the case where battery temperature BT is in the low or high-temperature region, converter control means 303B sets the output timing of signal PWMC to the timing at which engine revolution number ONE is "0," namely the timing at which engine ENG is stopped.

Specifically, in converter control means 303B shown in FIG. 16, receiving signal STAT of L level from external ECU 60B, inverter input voltage command calculation unit 50B calculates the final target voltage (voltage command Vdc_com) based on the torque command value and motor revolution number of one of motor generators MG1 and MG2 that is higher in drive voltage. Further, inverter input voltage command calculation unit 50B calculates second voltage command Vdc_stp based on battery input Win and battery output Wout derived from battery temperature BT.

Then, when it is determined that detected battery temperature BT is in the low or high-temperature region, inverter input voltage command calculation unit 50A outputs the calculated voltage command Vdc_com, Vdc_stp, at the timing at which motor revolution number MRNE is "0," to feedback voltage command calculation unit 52A and determination unit 56.

With the above-described configuration, in the case where battery temperature BT is in the low or high-temperature region, motor generator MG1 coupled to engine ENG is driven in regenerative mode and the operation of stopping the motor is completed and, thereafter voltage step-up converter 12 is driven and controlled to start the voltage step-down operation. Accordingly, even when battery input Win is small, excessive electric power can be prevented from being brought into battery B.

In contrast, in the case where battery temperature BT is in the normal region, converter control means 303B outputs signal PWMC to voltage step-up converter 12 without adjusting the output timing.

Figure 18:
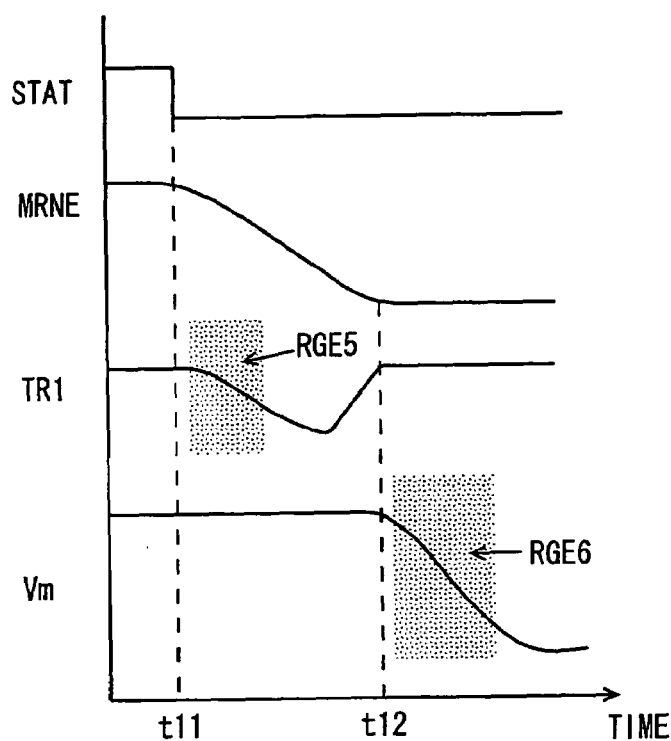
FIG. 18 is a timing chart of signals and voltage in the case where the motor generator coupled to the engine shown in FIG. 14 is driven in regenerative mode.

FIG. 18 is a timing chart of signals and voltage in the case where motor generator MG1 coupled to engine ENG shown in FIG. 14 is driven in regenerative mode. FIG. 18 is applied to the case where battery temperature BT is in the low or high-temperature region.

Referring to FIG. 18, signal STAT changes from H level to L level at timing t11 and an instruction to stop engine ENG is issued. Then, torque command value TR1 decreases as engine revolution number MRNE decreases. According to signal STAT of L level, inverter control means 301 generates signal PWMI1 based on torque command value TR1, motor current MCRT1 and output voltage Vm to output the generated signal to inverter 14.

Converter control means 303B generates, based on torque command value TR1, motor revolution number RN1, DC voltage Vb, output voltage Vm, battery input Win and battery output Wout, signal PWMC according to the aforementioned method. When it is determined that battery temperature BT is in the low or high-temperature region, converter control means 303B outputs the generated signal PWMC to voltage step-up converter 12 at timing t12 at which engine revolution number MRNE reaches "0."

Accordingly, motor generator MG1 is driven in regenerative mode and the generated power is supplied through inverter 14 to charge capacitor C2. Further, voltage step-up converter 12 starts to be driven according to signal PWMC that is output from control device 30B at timing t12 at which engine ENG is stopped, and steps down output voltage Vm to target voltage Vdc_com. The step-down rate of voltage step-up converter 12 is determined based on battery input Win correlated with detected battery temperature BT, as described above.

As seen from the above, in the third embodiment of the present invention, in the case where battery temperature BT is in the low or high-temperature region, inverter 14 is first driven and controlled when an instruction to stop engine ENG is given and, after the operation of stopping the motor by inverter 14 is completed, voltage step-up converter 12 is driven and controlled.

As a result, the power generated by motor generator MG1 reaches the maximum in region RGE5 between timing t11 and timing t12 and the power generated by stepping down output voltage Vm to be input to battery B reaches the maximum in region RGE6 after timing t12. Thus, region RGE5 where the power obtained by driving motor generator MG1 in regenerative mode reaches the maximum and region RGE6 where the power obtained by stepping down output voltage Vm reaches the maximum are completely separated from each other. Thus, even when the temperature is low or high where the battery output is small, excessive electric power can be prevented from being brought from voltage step-up converter 12 and inverters 14, 31 into battery B.

Figure 19:
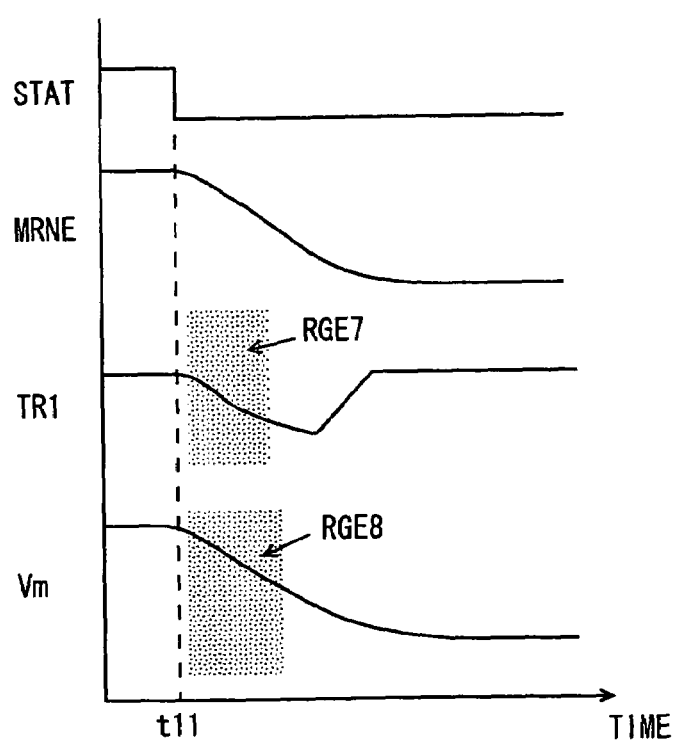
FIG. 19 is another timing chart of signals and voltage when the motor generator coupled to the engine shown in FIG. 14 is driven.

FIG. 19 is another timing chart of signals and voltage in the case where motor generator MG1 coupled to engine ENG shown in FIG. 14 is driven.

Referring to FIG. 19, in the case where the third embodiment of the present invention is not applied, when signal STAT changes from H level to L level at timing t11 and an instruction to stop engine ENG is issued, torque command value TR1 decreases as engine revolution number MRNE decreases. Based on torque command value TR1, motor current MCRT1 and output voltage Vm, inverter control means 301 generates signal PWMI1 according to the aforementioned method and outputs the generated signal to inverter 14.

Converter control means 303B generates, based on torque command value TR1, motor revolution number MRN1, DC voltage Vb, output voltage Vm and battery temperature BT, signal PWMC according to the aforementioned method and outputs the generated signal to voltage step-up converter 12.

Then, motor generator MG1 is driven in regenerative mode, the generated power is supplied through inverter 14 to charge capacitor C2 and, at the same timing, voltage step-up converter 12 steps down output voltage Vm according to signal PWMC.

As a result, the power generated by motor generator MG1 reaches the maximum in region RGE7 after timing t11 and the power generated by the voltage step-down operation reaches the maximum in region RGE8 after timing t11. Thus, region RGE7 where the power generated by driving motor generator MG1 reaches the maximum and region RGE8 where the power generated by the voltage step-down operation reaches the maximum overlap each other to cause excessive electric power to be brought from inverter 14 and voltage step-up converter 12 into battery B.

As discussed above, the third embodiment of the present invention can be applied to each of the cases where (1) engine is started and (2) engine is stopped to prevent excessive electric power from being input/output to/from battery B even when battery temperature BT is in the low or high-temperature region and battery input Win and battery output Wout are small.

Referring again to FIG. 14, in motor drive apparatus 100B, when motor generator MG2 drives the hybrid vehicle and engine ENG is started, motor generator MG1 is driven and controlled in powering mode after the voltage step-up operation by voltage step-up converter 12 is completed. In particular, when battery temperature BT is in the low or high-temperature region, torque command value TR1 is input to control device 30B in response to completion of the voltage step-up operation by voltage step-up converter 12 and accordingly motor generator MG1 is started to be driven and controlled after the completion of the voltage step-up operation.

In this way, the power consumed when motor generator MG1 is driven in powering mode can be dispersed with respect to time and excessive electric power can be prevented from being taken from battery B regardless of the magnitude of battery output Wout.

Between the timing at which the voltage step-up operation is completed by voltage step-up converter 12 and the timing at which torque command value TR1 is input from external ECU 60B to control device 30B, a predetermined delay time can be provided to ensure that the power taken from battery B when the engine is started is dispersed with respect to time.

Moreover, in motor drive apparatus 100B, when the hybrid vehicle is driven in powering by motor generator MG2 and engine ENG is stopped, and it is detected that battery temperature BT is in the low or high-temperature region, voltage step-up converter 12 starts the voltage step-down operation after the operation of stopping motor generator MG1 by inverter 14 is completed.

Thus, the charging power for driving motor generator MG1 in regenerative mode can be dispersed with respect to time so that excessive electric power can be prevented from being brought into battery B regardless of the magnitude of the battery output.

While it is described above that voltage step-up converter 12 starts the voltage step-down operation at a timing that is after inverter 14 completes the operation of stopping motor generator MG1, the present invention is not limited to this. Voltage step-up converter 12 may start the voltage step-down operation after inverter 14 starts the operation of stopping motor generator MG1.

Alternatively, between the timing at which inverter 14 completes the operation of stopping motor generator MG1 and the timing at which voltage step-up converter 12 starts the voltage step-down operation, a predetermined delay time may be provided, so that it is further ensured that the power brought into battery B when the engine is stopped can be dispersed with respect to time.

In addition, while it is described above that how voltage step-up converter 12 and inverter 14 are driven and controlled when motor generator MG2 drives the hybrid vehicle and an instruction to start or stop engine ENG is given, the present invention is applied widely to any case where the above-described power balance P is not established in motor drive apparatus 100B and it is necessary to input/output electric power to/from battery B.

INDUSTRIAL APPLICABILITY

The present invention is applied to a motor drive apparatus capable of preventing excessive electric power from being input/output to/from a power supply.

The invention claimed is:
1. A motor drive apparatus comprising:
a first drive circuit driving a first motor;
a voltage converter performing a voltage conversion between a power supply and said first drive circuit; and a capacitor provided between said voltage converter and said first drive circuit; and a control device for controlling said first drive circuit and said voltage converter, wherein said voltage converter performs a voltage step-up operation of stepping up a power supply voltage to an arbitrary level and outputs the stepped-up voltage, and said first drive circuit starts an electric power conversion for driving said first motor in powering mode after said voltage step-up operation is completed, and said control device includes:
- a target voltage determination unit for determining a target voltage of said stepped-up voltage based on the number of revolutions of said first motor;
- a voltage conversion control unit receiving the target voltage determined by said target voltage determination unit for controlling said voltage converter such that said stepped-up voltage is equal to said target voltage;
- a determination unit for determining whether or not said stepped-up voltage reaches said target voltage and, when said determination unit determines that said stepped-up voltage reaches said target voltage, generating a signal indicating completion of the voltage step-up operation; and
- an electric power conversion control unit for causing said first drive circuit to start an electric power conversion for converting said stepped-up voltage into a drive voltage for said first motor, when said electric power conversion control unit receives said generated signal from said determination unit.

2. The motor drive apparatus according to claim 1, wherein said first drive circuit receives, after said voltage step-up operation is completed, a required power of said first motor and starts to drive said first motor in powering mode.

3. The motor drive apparatus according to claim 2, wherein said first drive circuit holds in advance a relation between temperature of said power supply and an electric power level that can be output from said power supply, and determines a timing at which said first motor is started to be driven, based on the temperature of said power supply.

4. The motor drive apparatus according to claim 3, wherein when the temperature of said power supply is lower than a first predetermined threshold or the temperature of said power supply is higher than a second predetermined threshold, said first drive circuit receives the required power of said first motor after said voltage step-up operation is completed, and starts to drive said first motor in powering mode.

5. The motor drive apparatus according to claim 4, wherein a predetermined delay time is provided between a timing at which said voltage step-up operation is completed and a timing at which said first drive circuit starts to drive.

6. The motor drive apparatus according to any of claim 1, wherein said first motor is a motor starting or stopping an internal combustion engine, and said voltage converter starts said voltage step-up operation when an instruction to start said internal combustion engine is output.

7. The motor drive apparatus according to claim 6, wherein receiving said instruction to start said internal combustion engine, said voltage conversion control unit controls said voltage converter to obtain a predetermined stepped-up voltage that is necessary for starting said internal combustion engine, regardless of said determined target voltage.

8. The motor drive apparatus according to claim 7, wherein said predetermined stepped-up voltage is a maximum voltage of said motor drive apparatus.

9. The motor drive apparatus according to claim 8, wherein said voltage conversion control unit determines a voltage step-up rate so that electric power required for said voltage step-up operation is within the electric power level that can be output from said power supply, and said power supply voltage is stepped up to said predetermined stepped-up voltage at said determined voltage step-up rate.

10. The motor drive apparatus according to claim 9, wherein said voltage conversion control unit holds in advance a relation between temperature of said power supply and the electric power level that can be output from said power supply, and determines said voltage step-up rate based on the temperature of said power supply.

11. The motor drive apparatus according to claim 7, further comprising a second drive circuit provided in parallel with said first drive circuit, and receiving said stepped-up voltage to drive a second motor, wherein said target voltage determination unit determines said target voltage based on the number of revolutions of said first motor or said second motor, and when said second motor drives a vehicle and an instruction to start said internal combustion engine is issued, said voltage conversion control unit controls said voltage converter to obtain said predetermined stepped-up voltage before said internal combustion engine is started.

12. The motor drive apparatus according to claim 11, wherein said predetermined stepped-up voltage is a maximum voltage of said motor drive apparatus.

13. The motor drive apparatus according to claim 12, wherein said voltage conversion control unit determines a voltage step-up rate so that electric power required for said voltage step-up operation is within the electric power level that can be output from said power supply, and steps up said power supply voltage at said determined voltage step-up rate to said predetermined stepped-up voltage.

14. The motor drive apparatus according to claim 13, wherein said voltage conversion control unit holds in advance a relation between temperature of said power supply and the electric power level that can be output from said power supply, and determines said voltage step-up rate based on the temperature of said power supply.

15. A motor drive apparatus comprising:

a first drive circuit driving a first motor;

a voltage converter performing a voltage conversion between a power supply and said first drive circuit;

a capacitor provided between said voltage converter and said first drive circuit; and a control device for controlling said first drive circuit and said voltage converter, wherein said voltage converter starts a voltage step-down operation for stepping down a voltage supplied from said first drive circuit after said first drive circuit drives said first motor in regenerative mode and stops said first motor, and said control device includes:
- an electric power conversion control unit for controlling said first drive circuit such that said first motor is driven in said regenerative mode;
- a target voltage determination unit for determining a target voltage of an output voltage of said voltage converter, based on the number of revolutions of said first motor; and
- a voltage conversion control unit receiving the target voltage determined by said target voltage determination unit and generating a signal for controlling said voltage converter such that said output voltage is equal to said target voltage; and
- said voltage conversion control unit outputs said generated signal to said voltage converter after said first motor is stopped.

16. The motor drive apparatus according to claim 15, wherein
    said voltage converter holds in advance a relation between temperature of said power supply and an electric power level that can be input to said power supply, and determines a timing at which said voltage step-down operation is started, based on the temperature of said power supply.

17. The motor drive apparatus according to claim 16, wherein
    when the temperature of said power supply is lower than a first predetermined threshold or higher than a second predetermined threshold, said first drive circuit starts said voltage step-down operation after stopping said first motor.

18. The motor drive apparatus according to claim 17, wherein
    a predetermined delay time is provided between a timing at which said first motor is stopped and a timing at which said voltage step-down operation is started.

19. The motor drive apparatus according to claim 15, wherein
    said first motor is a motor starting or stopping an internal combustion engine,
    when an instruction to stop said internal combustion engine is output, said first drive circuit starts to drive said first motor in said regenerative mode, and
    said voltage converter starts said voltage step-down operation in response to completion of the stoppage of said internal combustion engine.

20. The motor drive apparatus according to claim 19, wherein
    in response to the stoppage of said internal combustion engine, said voltage conversion control unit determines a voltage step-down rate so that electric power generated by said voltage step-down operation is within an electric power level that can be input to said power supply, and controls said voltage converter to obtain said target voltage at said determined voltage step-down rate.

21. The motor drive apparatus according to claim 20, wherein
    said voltage conversion control unit holds in advance a relation between temperature of said power supply and the electric power level that can be input to said power supply, and determines said voltage step-down rate based on the temperature of said power supply.

22. The motor drive apparatus according to claim 19, further comprising a second drive circuit provided in parallel with said first drive circuit and receiving said output voltage to drive a second motor, wherein
    said target voltage determination unit determines said target voltage based on the number of revolutions of said first motor or said second motor, and
    when said second motor drives a vehicle and an instruction to stop said internal combustion engine is issued, said voltage conversion control unit controls said voltage converter to obtain said target voltage after said internal combustion engine is stopped.

* * * * *